US012585779B2

(12) United States Patent
Krishnan et al.

(10) Patent No.: US 12,585,779 B2
(45) Date of Patent: Mar. 24, 2026

(54) SECURE PROGRAMMING OF ONE-TIME-PROGRAMMABLE (OTP) MEMORY

(71) Applicant: Microchip Technology Incorporated, Chandler, AZ (US)

(72) Inventors: Arun Krishnan, Smithtown, NY (US); Eileen Marando, Bellmore, NY (US); Ravindra Kumar, Austin, TX (US)

(73) Assignee: Microchip Technology Incorporated, Chandler, AZ (US)

( * ) Notice: Subject to any disclaimer, the term of this patent is extended or adjusted under 35 U.S.C. 154(b) by 338 days.

(21) Appl. No.: 18/110,434

(22) Filed: Feb. 16, 2023

(65) Prior Publication Data
US 2023/0259629 A1 Aug. 17, 2023

Related U.S. Application Data

(60) Provisional application No. 63/311,331, filed on Feb. 17, 2022.

(51) Int. Cl.
*G06F 21/57* (2013.01)
*G06F 3/06* (2006.01)

(52) U.S. Cl.
CPC .......... *G06F 21/575* (2013.01); *G06F 3/0622* (2013.01); *G06F 3/0637* (2013.01); *G06F 3/0673* (2013.01); *G06F 2221/034* (2013.01)

(58) Field of Classification Search
None
See application file for complete search history.

(56) References Cited

U.S. PATENT DOCUMENTS 11,250,135 B1 * 2/2022 Zhang ..................... G06F 21/44
2011/0010770 A1 * 1/2011 Smith ..................... H04L 9/083
726/18

(Continued)

FOREIGN PATENT DOCUMENTS

JP       2012532466 A     12/2012    ............. H01L 21/02
JP       2017004293 A      1/2017    ............. G06F 21/62

OTHER PUBLICATIONS

Ekberg, JE., Asokan, N. (2010). External Authenticated Non-volatile Memory with Lifecycle Management for State Protection in Trusted Computing. In: Chen, L., Yung, M. (eds) Trusted Systems. INTRUST 2009. Lecture Notes in Computer Science, vol. 6163. Springer, Berlin, Heidelberg. (Year: 2010).*

(Continued)

*Primary Examiner* — Edward J Dudek, Jr.
*Assistant Examiner* — Ralph A Verderamo, III
(74) *Attorney, Agent, or Firm* — SLAYDEN GRUBERT BEARD PLLC

(57) ABSTRACT

An electronic device may have a plurality of defined life cycle stages and a one-time-programmable (OTP) memory comprising a plurality of life cycle bits, wherein respective bit patterns of the life cycle bits may correspond with respective life cycle stages of the defined life cycle stages. The electronic device may also have a boot code stored in read only memory and executable by a processor to receive a request to transition from a current life cycle stage to a next life cycle stage and, in response to the received request, automatically generate a bit pattern corresponding to the next life cycle stage of the plurality of defined life cycle stages and program the bit pattern corresponding to the next life cycle stage of the plurality of defined life cycle stages in the OTP memory during a time when the OTP memory is not user-accessible.

23 Claims, 17 Drawing Sheets

(56) References Cited

U.S. PATENT DOCUMENTS

| | | | |
|---|---|---|---|
| 2011/0063093 A1 | 3/2011 | Fung et al. | |
| 2012/0102334 A1* | 4/2012 | O'Loughlin | H04L 9/3252 |
| | | | 713/189 |
| 2014/0108825 A1 | 4/2014 | O'Loughlin et al. | 713/193 |
| 2018/0189493 A1 | 7/2018 | Schilder et al. | |
| 2020/0195432 A1* | 6/2020 | Doll | G06F 21/79 |
| 2020/0210587 A1* | 7/2020 | Shi | G11C 29/24 |
| 2020/0348890 A1* | 11/2020 | Colombo | G06F 21/76 |

OTHER PUBLICATIONS

International Search Report and Written Opinion, Application No. PCT/US2023/013271, 11 pages, Jun. 23, 2023.
Japanese Office Action, Application No. 2024-519875, 4 pages, Aug. 26, 2025.

* cited by examiner

110

Key (Life Cycle Bits):    = unprogrammed (unfused)
                          = programmed (fused)

203a        203b        203c        203d        203e        203f

| Life Cycle Bits | Life Cycle Bits | Life Cycle Bits | Life Cycle Bits | Life Cycle Bits | Life Cycle Bits |
|---|---|---|---|---|---|
| 0 | 0 | 0 | 0 | 0 | 0 |
| 1 | 1 | 1 | 1 | 1 | 1 |
| 2 | 2 | 2 | 2 | 2 | 2 |
| 3 | 3 | 3 | 3 | 3 | 3 |
| 4 | 4 | 4 | 4 | 4 | 4 |
| 5 | 5 | 5 | 5 | 5 | 5 |
| 6 | 6 | 6 | 6 | 6 | 6 |
| 7 | 7 | 7 | 7 | 7 | 7 |
| 8 | 8 | 8 | 8 | 8 | 8 |

404a        404b        404c        404d        404e        404f

RAW → MFG → DEV → PROD → FA → EOL

410

408

171

SECURE PROGRAMMING OF ONE-TIME-PROGRAMMABLE (OTP) MEMORY

PRIORITY

The present application claims priority to U.S. Provisional Patent Application No. 63/311,331 filed Feb. 17, 2022, the contents of which are hereby incorporated in their entirety.

FIELD OF THE INVENTION

The present disclosure relates to electronic device provisioning, and more particularly to systems and methods for managing the life cycle of an electronic device through secure programming of one-time-programmable (OTP) memory of the electronic device.

BACKGROUND

Conventional techniques for OTP memory programming of information during configuration of a device (e.g., chip) typically provide visibility to the entire configuration memory map, thus leaving the OTP memory open to attack, e.g., to alter the device configuration. Different steps in a typical device life cycle (e.g., including manufacturing, development, and customer programming by third parties) may require access to the OTP memory. Thus, without controlled measures, all OTP regions may be accessible and prone to attack. For example, factory mode configuration regions may be altered at a later stage in the device life cycle, which can lock or unlock features not intended for a specific production line.

The present disclosure provides an irreversible life cycle system for secure one-time programming of an electronic device over multiple defined life cycle stages, wherein access to various resources of the electronic device may be constrained based on the current life cycle.

SUMMARY

According to one example, a system may include an electronic device. The electronic device may be a server, a device associated with a server, or a computing platform, and the system may be a secure boot controller for the server, a device associated with the server, or a computing platform. The electronic device may have a plurality of defined life cycle stages and may include a one-time-programmable (OTP) memory with a plurality of life cycle bits. Respective bit patterns of the plurality of life cycle bits may correspond with respective life cycle stages of the plurality of defined life cycle stages. The electronic device may also have a boot code stored in read only memory (ROM). The boot code may be executable by a processor to receive a request to transition from a current life cycle stage of the plurality of defined life cycle stages to a next life cycle stage of the plurality of defined life cycle stages. The request to transition from a current life cycle stage of the plurality of defined life cycle stages to a next life cycle stage of the plurality of defined life cycle stages may be received via a physical port of the electronic device or via a firmware loaded onto the electronic device. According to an example, the request to transition from a current life cycle stage of the plurality of defined life cycle stages to a next life cycle stage of the plurality of defined life cycle stages may be a signed command. The boot code may also be executable to, in response to the received request, automatically generate a bit pattern corresponding to the next life cycle stage of the plurality of defined life cycle stages and program the bit pattern corresponding to the next life cycle stage of the plurality of defined life cycle stages in the OTP memory during a time when the OTP memory is not user-accessible. In one example, the time when the OTP memory is not user-accessible may be during a subsequent reset of the electronic device, which reset may be a device reset, a reboot, or a power cycle of the electronic device. According to an example, the boot code programming the bit pattern corresponding to the next life cycle stage of the plurality of defined life cycle states in the OTP memory may cause a transition from the current life cycle stage of the plurality of defined life cycle stages to the next life cycle stage of the plurality of defined life cycle stages.

In an example, the boot code may, in response to the received request, automatically generate a device unique information and program the device unique information in the OTP memory during the time when the OTP memory is not user-accessible.

In an example, for respective life cycle stages of the plurality of defined life cycle stages, the boot code may make available to the user a corresponding respective set of available functions that may be performable during the respective life cycle stage of the plurality of defined life cycle stages. According to an example, the respective set of available functions that may be performable during a first life cycle stage of the plurality of defined life cycle stages may include a first function; and the respective set of available functions that may be performable during a second life cycle stage of the plurality of defined life cycle stages may exclude the first function.

Another example provides a system that may include an electronic device having an OTP memory, where the OTP memory may include a plurality of life cycle OTP bits. A life cycle bit map may be associated with a plurality of defined life cycle stages of the electronic device. The life cycle bit map may specify a plurality of life cycle OTP bit patterns, where respective life cycle OTP bit patterns may correspond with respective life cycle stages of the electronic device. Life cycle function data may specify a set of available functions for respective life cycle stages. The specified set of available functions for respective life cycle stages may define functions that may be performable during the respective life cycle stage of the electronic device. The specified set of available functions for a respective first life cycle stage may differ from the specified set of available functions for a respective second life cycle stage. The example system may include boot code that may be stored in read only memory. The boot code may be executable by a processor to manage the provisioning of the electronic device through a series of life cycle stages. The boot code may be executable by the processor to selectively program, during a time when the OTP memory is not user-accessible, the plurality of life cycle OTP bits over time to advance the electronic device through the series of life cycle stages. The boot code may be executable by the processor to allow access, while the electronic device is operating in the respective first life cycle stage, to only the set of available functions for the respective first life cycle stage as specified by the life cycle function data.

In an example, the boot code may be executable by the processor to automatically generate a device unique information and program the device unique information in the OTP memory during a time when the OTP memory is not user-accessible.

According to an example, the boot code may be executable by the processor to selectively program, in response to a signed command, the plurality of life cycle OTP bits over time to advance the electronic device through the series of life cycle stages.

Another example provides a method for an electronic device having an OTP memory, a plurality of defined life cycle stages, and a plurality of defined functions. The method may include providing access to a first set of the plurality of defined functions while the electronic device is in a first life cycle stage of the plurality of defined life cycle stages. The method may include receiving a request to transition the electronic device from the first life cycle stage of the plurality of defined life cycle stages to a second life cycle stage of the plurality of defined life cycle stages. In an example, the request to transition the electronic device from the first life cycle stage of the plurality of defined life cycle stages to the second life cycle stage of the plurality of defined life cycle stages may be received via a physical port of the electronic device or via a firmware loaded onto the electronic device. In an example, the request to transition the electronic device from the first life cycle stage of the plurality of defined life cycle stages to the second life cycle stage of the plurality of defined life cycle stages may be a signed command. The method may include, in response to the received request to transition the electronic device from the first life cycle stage of the plurality of defined life cycle stages to the second life cycle stage of the plurality of defined life cycle stages, transitioning the electronic device to the second life cycle stage of the plurality of defined life cycle stages by programming the OTP memory, during a first time when the OTP memory is not user-accessible, with information corresponding to the second life cycle stage of the plurality of defined life cycle stages. In one example, the time when the OTP memory is not user-accessible may be during a subsequent reset of the electronic device, which reset may be a device reset, a reboot, or a power cycle of the electronic device. The method may include providing access to a second set of the plurality of defined functions while the electronic device is in the second life cycle stage of the plurality of defined life cycle stages. In an example, the first set of the plurality of defined functions may include a first function and the second set of the plurality of defined functions may exclude the first function.

According to an example, the method may include, in response to the received request to transition the electronic device from the first life cycle stage of the plurality of defined life cycle stages to the second life cycle stage of the plurality of defined life cycle stages, automatically generating and programming a device-unique information in the OTP memory during the time when the OTP memory is not user-accessible.

In an example, the method may include, subsequent to transitioning the electronic device to the second life cycle stage of the plurality of defined life cycle stages, prohibiting transitioning the electronic device to the first life cycle stage of the plurality of defined life cycle stages.

In an example, the method may include receiving a request to transition the electronic device from the second life cycle stage of the plurality of defined life cycle stages to a third life cycle stage of the plurality of defined life cycle stages. The method may include, in response to the received request to transition the electronic device from the second life cycle stage of the plurality of defined life cycle stages to the third life cycle stage of the plurality of defined life cycle stages, transitioning the electronic device to the third life cycle stage of the plurality of defined life cycle stages by programming the OTP memory, during a second time when the OTP memory is not user-accessible, with information corresponding to the third life cycle stage of the plurality of defined life cycle stages. The method may include providing access to a third set of the plurality of defined functions while the electronic device is in the third life cycle stage of the plurality of defined life cycle stages. In an example, the method may include, subsequent to transitioning the electronic device to the third life cycle stage of the plurality of defined life cycle stages, prohibiting transitioning the electronic device to the second life cycle stage of the plurality of defined life cycle stages.

BRIEF DESCRIPTION OF THE DRAWINGS

The figures illustrate example methods and systems for managing the life cycle of an electronic device through secure programming of one-time-programmable (OTP) memory of the electronic device.

Figure 1:
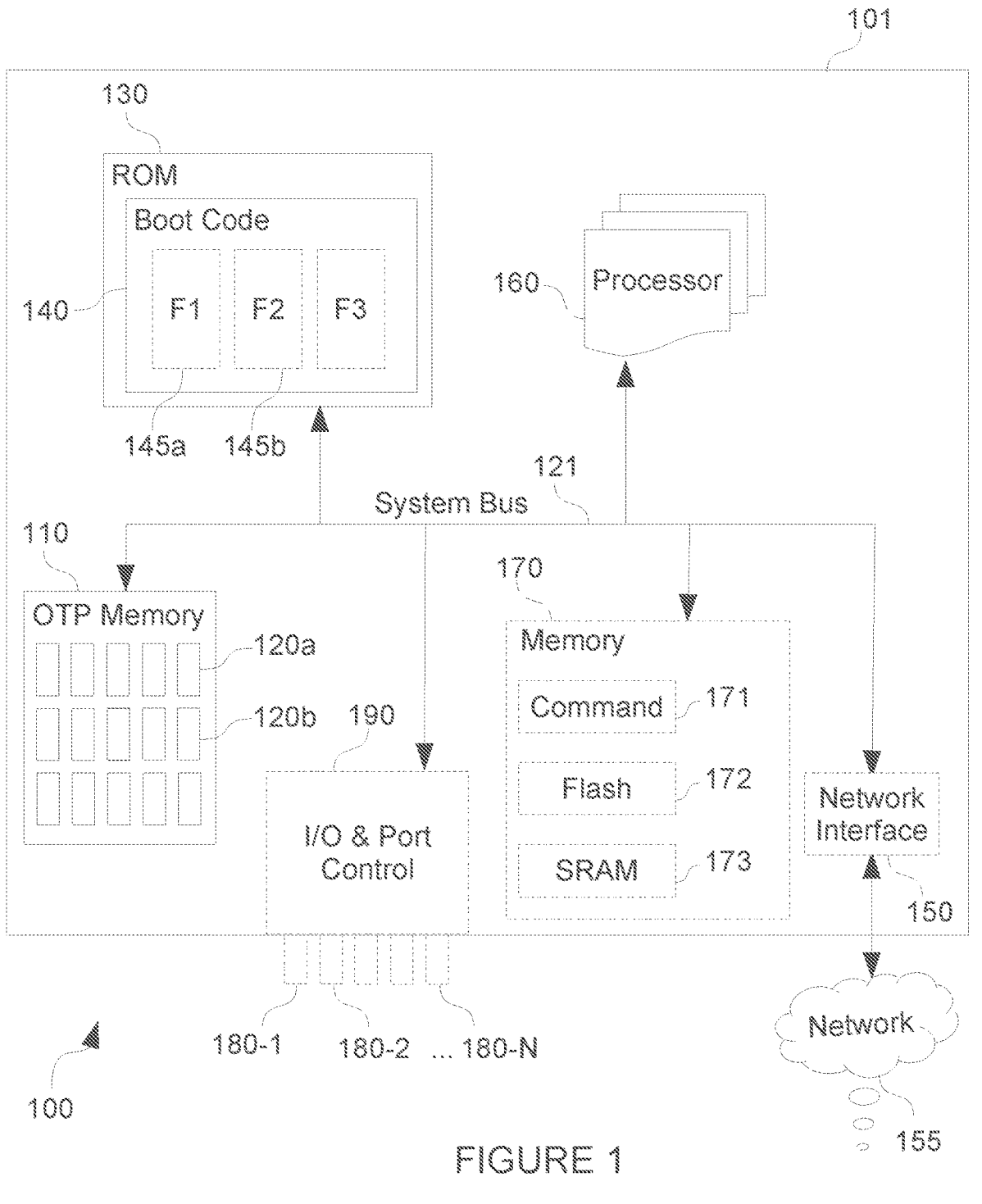
FIG. 1 illustrates a block diagram of an example system for managing the life cycle of an electronic device through secure programming of OTP memory of the electronic device.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DETAILED DESCRIPTION

When an electronic device (e.g., a microcontroller) starts up (e.g., power on or after a hardware or software reset), boot code may be loaded and executed by a processor on the device. The boot code may perform functions related to the device start-up, for example, initializing the hardware, which may include disabling interrupts, initializing buses, setting processor(s) in a specific state, and initializing memory. After performing the hardware initialization, the boot code may then load the system software, for example, from an application image. The functions performed by the boot code may be called the boot process.

An electronic device may be capable of transitioning through various life cycle stages over time. Various features or functions of the electronic device may be available in some life cycle stages and may be unavailable in other life cycle stages. The features and functions available in a particular life cycle stage may relate to the security of the device. For example, a cryptographic key that may be used to verify code running on the electronic device may be accessible in one or more life cycle stages but may be inaccessible in other life cycle stages. In another example, a function that may establish or allow the establishment of secure information for the electronic device may be available in one or more life cycle stages but may be unavailable in other life cycle stages. In this manner, the level of security of the electronic device at a given time may correspond to the life cycle stage of the electronic device at that time.

The electronic device may contain security mechanisms to protect against malicious attacks on the device. For example, because the level of the security of the electronic device may correspond to the life cycle stage of the electronic device, it may contain features that prevent an attacker from changing the life cycle stage of the electronic device.

Security features for an electronic device may be implemented using the boot code on the electronic device. In an example, the security features may be implemented using immutable boot code. Immutable boot code, which may be referred to as a hardware root of trust, may be built into the electronic device during fabrication and, therefore, may be implicitly trusted because it cannot be modified.

For the purposes of this disclosure, an electronic device may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an electronic device may be a personal computer, a PDA, a consumer electronic device, a server, a network storage device, or any other suitable device and may vary in size, shape, performance, functionality, and price. The electronic device may include memory, one or more processing resources such as a central processing unit (CPU) or hardware or software control logic. Additional components of the electronic device may include one or more storage devices, one or more communications ports for communicating with external devices as well as various input and output (I/O) devices, such as a keyboard, a mouse, and a video display. The electronic device may also include one or more buses operable to transmit communication between the various hardware components.

FIG. 1 illustrates a block diagram of an example system 100 for managing the life cycle of an electronic device 101 through secure programming of OTP memory of the electronic device. As depicted in FIG. 1, system 100 may comprise electronic device 101. Components of electronic device 101 may include, without limitation, one or more processors 160 and a system bus 121 that communicatively couples various system components to processors 160 including, for example, OTP memory 110, ROM 130, memory 170, I/O & port control 190, and a network interface 150. The system bus 121 may be any suitable type of bus structure, e.g., a memory bus, a peripheral bus, or a local bus using any of a variety of bus architectures.

Processor 160 may comprise any system, device, or apparatus operable to interpret or execute program instructions or process data, and may include, without limitation a microprocessor, microcontroller, digital signal processor (DSP), application specific integrated circuit (ASIC), or any other digital or analog circuitry to interpret or execute program instructions or process data. In some examples, processor 160 may interpret or execute program instructions or process data stored locally (e.g., in memory 170, ROM 130, OTP memory 110, or another component of electronic device 101). In the same or alternative examples, processor 160 may interpret or execute program instructions or process data stored remotely.

OTP memory 110 (one-time-programmable memory) may comprise any system, device, or apparatus that can be programmed only once and thereafter retain the programmed data. OTP memory 110 may comprise one-time-programmable bits 120a, 120b, and others. In an example, bits 120a and 120b of OTP memory 110 may comprise traditional logic gates connected with metal wiring and the connections may be paired with fuses. During programming, the fuses may be blown out in order to make these connections permanent. In this manner, OTP memory 110 may be unmodifiable once programmed. In an example, an unprogrammed bit (e.g., 120a, 120b) may return a value of 0 when read by processor 160 whereas a programmed bit may return a value of 1 when read by processor 160. According to this example, once the bit 120a, 120b has been programmed with a 1 value, it cannot be re-programmed to a 0 value.

ROM 130 may comprise any system, device, or apparatus operable to retain program instructions or data after power to electronic device 101 is turned off (e.g., a non-volatile memory). ROM 130 (e.g., boot ROM) may comprise boot code 140, which may be used by processor 160 during the boot process (or start-up) of electronic device 101. According to an example, boot code 140 may be immutable, i.e., built into the electronic device during fabrication and, therefore, may be implicitly trusted (e.g., a hardware root of trust) because it cannot be modified. Boot code 140 may comprise code that performs functions including, without limitation, functions F1 (145a) and F2 (145b), among others.

Memory 170 may comprise any system, device, or apparatus operable to retain program instructions or data for a period of time. Memory 170 may comprise random access memory (RAM, SRAM, DRAM), electrically erasable programmable read-only memory (EEPROM), a PCMCIA card, flash memory, magnetic storage, opto-magnetic storage, hardware registers, or any suitable selection or array of volatile or non-volatile memory. In the illustrated example, memory 170 includes, without limitation, command memory 171, flash memory 172, and SRAM 173.

I/O & port control 190 may comprise any system, device, or apparatus generally operable to receive or transmit data to/from/within electronic device 101. I/O & port control 190 may comprise, for example, any number of communication interfaces, graphics interfaces, video interfaces, user input interfaces, or peripheral interfaces (e.g., without limitation, JTAG, I2C, UART, Test Access Port). I/O & port control 190 may be communicatively coupled to external ports/pins 180-1, 180-2, . . . 180-N (and others not depicted).

Network interface 150 may be any suitable system, apparatus, or device operable to serve as an interface between electronic device 101 and a network 155. Network interface 150 may enable electronic device 101 to communicate over network 155 using any suitable transmission protocol or standard. Network 155 and its various components may be implemented using hardware, software, or any combination thereof.

Although FIG. 1 illustrates various components of electronic device 101, other example systems may include electronic devices with more or fewer components. In an example, an electronic device 101 according to this disclosure may not include one or all of the components drawn in dashed lines without departing from the spirit and scope of these disclosed examples.

Figure 2:
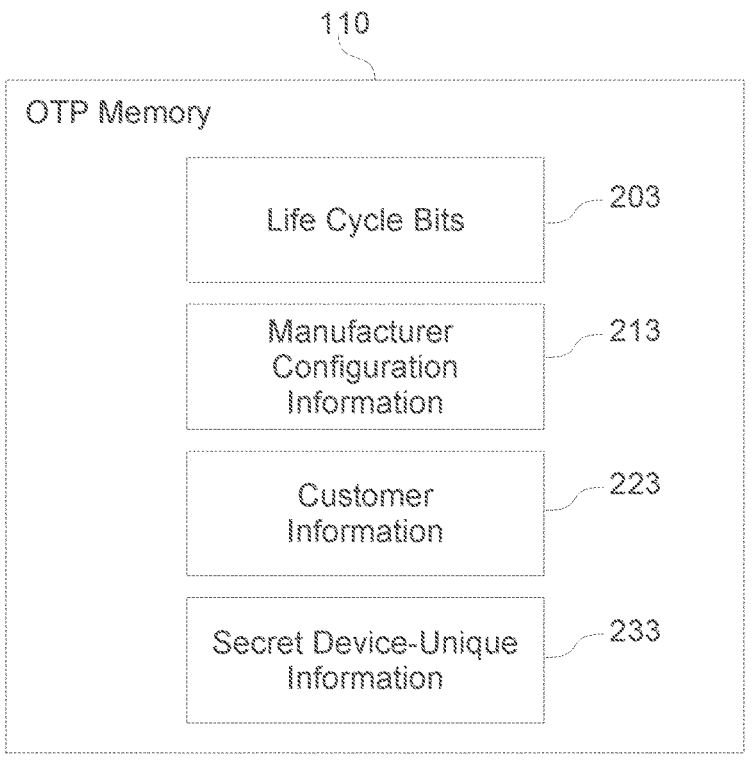
FIG. 2 illustrates an example OTP memory that may be used for managing the life cycle of an electronic device.

FIG. 2 illustrates an example OTP Memory 110 that may be used for managing the life cycle of an electronic device. As depicted in FIG. 2, OTP Memory 110 may comprise various defined regions including life cycle bits 203, manufacturer configuration information 213, customer information 223, and secret device-unique information 233. In an example, life cycle bits 203 may be programmed (fused) by boot code 140 and may cause a transition between different life cycle stages in a defined series of life cycle stages for electronic device 101. In the same or another example, manufacturer configuration information 213 may be programmed (fused), for example, by a tester or other apparatus used by the manufacturer to program OTP memory 110 during provisioning of electronic device 101. Manufacturer configuration information 213 may include bits that enable, disable, or configure features on electronic device 101 (e.g., availability of GPIO pins, clock rate, and availability of security features); a public key of a public key cryptography key pair; and device identification information. In an example, customer information 223 may include bits programmed (fused) by a customer of electronic device 101.

In an example, secret device-unique information 233 may include (a) a device identity key ("DevIK") (e.g., a private key of a public-key cryptography key pair) or information from which a DevIK can be generated, (b) critical device configuration, e.g., image authenticity and key authenticity, (c) other cryptographic keys used by electronic device 101, or (d) other device-unique information. In some examples, secret device-unique information 233 may include (a) a unique device secret (UDS) or an encrypted UDS, or (b) a ROM seed (e.g., a random number generated by boot code 140), wherein boot code 140 may use such UDS and ROM seed as source data to generate a DevTK or other device-unique information.

Life Cycle Stages of Electronic Device 101

Electronic device 101 may be capable of transitioning through various life cycle stages over time. In an example, the life cycle stages may be defined by the manufacturer of electronic device 101 and may include, without limitation, the life cycle stages shown in TABLE 1.

TABLE 1

| STAGE | DESCRIPTION |
|---|---|
| 1 | RAW—initial stage of electronic device |
| 2 | MFG—manufacturing mode |

TABLE 1-continued

| STAGE | DESCRIPTION |
|---|---|
| 3 | DEV—development mode |
| 4 | PROD—production mode |
| 5 | FA—failure analysis mode |
| 6 | EOL—end of life |

Figure 13:
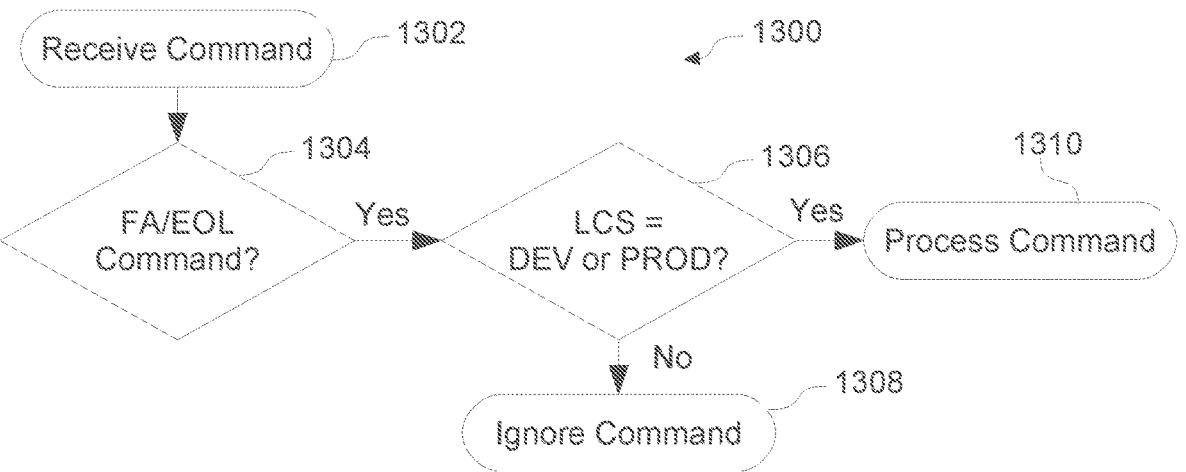
FIG. 13 illustrates a flow chart of an example method for managing the life cycle of an electronic device through secure programming of OTP memory of the electronic device.

In one example, the six life cycle stages may have the characteristics listed in TABLES 2-7. As disclosed in TABLES 2-7, different functions, features, and operations may be available in different life cycle stages. An example method for making functions available is illustrated in FIG. 13 and related text.

TABLE 2

| RAW | No features enabled (deters wafer theft). |
|---|---|
| | OTP configuration is not executed. |
| | MEMBIST, Scan, and XOR testing supported. |
| | Supports wafer probe testing. |
| | ROM and SRAM physical unclonable function (PUF) secrets are protected. |

TABLE 3

| MFG | OTP memory and internal SPI Flash provisioning supported. |
|---|---|
| | Test features supported. |
| | OTP production-level features are not executed (i.e., secure boot code 140 will not load code). |
| | Wafer probe testing supported. |
| | ROM and SRAM PUF secrets are protected. |

TABLE 4

| DEV | OTP memory and internal SPI Flash fully provisioned. |
|---|---|
| | Test and production-level features supported for lab bring-up. |
| | JTAG may be enabled while application code is executing (part is not considered secure). |
| | ROM and SRAM PUF secrets are protected. |

TABLE 5

| PROD | OTP memory and internal SPI Flash fully provisioned. |
|---|---|
| | Production-level features supported. |
| | Part is considered secure. No test access (e.g., JTAG), except boundary scan feature. |
| | ROM and SRAM PUF secrets are protected. |

TABLE 6

| FA | OTP memory and internal SPI Flash fully provisioned. |
|---|---|
| | Modified production-level and test features supported. No code executed that is loaded from SPI flash boot source. |
| | Part is not considered secure because JTAG access may be enabled. |
| | However, all OTP secrets are destroyed. |
| | ROM and SRAM PUF secrets are protected. |

TABLE 7

| EOL | OTP is destroyed. |
|---|---|
| | Internal SPI flash may still be fully provisioned. |
| | No test features and no production-level features are supported. |
| | ROM and SRAM PUF secrets are protected. |

Figure 3:
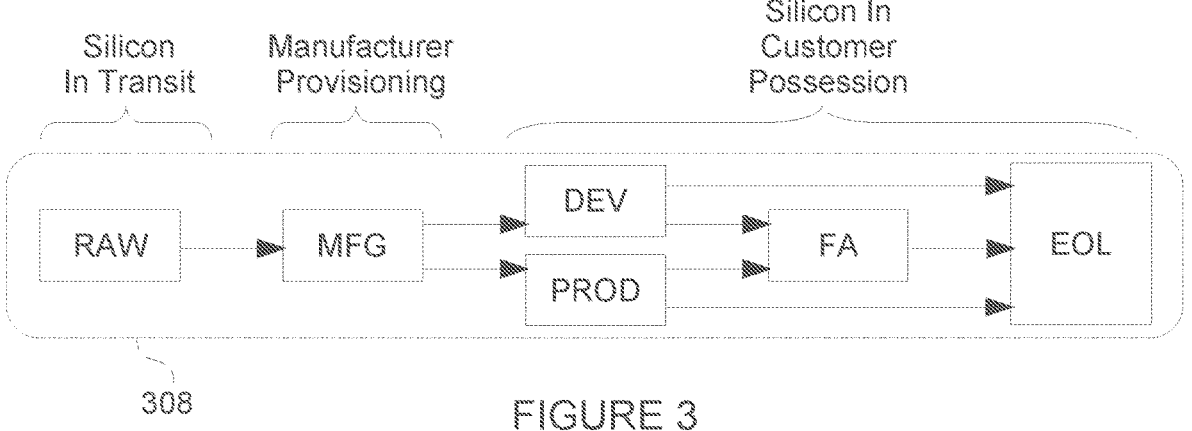
FIG. 3 illustrates an example of valid transitions from one life cycle stage to another in an electronic device.

Transitions between life cycle stages may be linear (e.g., from stage 1 to stage 6), may skip life cycle stages, or may be a combination of linear transitions while skipping one or more life cycle stages. In an example, the manufacturer of electronic device 101 may define the allowable transitions. Boot code 140 may enforce the manufacturer's defined allowable transitions by managing the transitions of electronic device 101 through the series of life cycle stages. FIG. 3 illustrates an example of valid transitions from one life cycle stage to another (e.g., the manufacturer's defined allowable transitions) by arrows between the different life cycle stages in series of life cycle stages 308. For example, from the RAW stage the device may be limited to transitions to the MFG stage. From the MFG stage, the device may transition to the DEV stage, or alternatively to the PROD stage. In some examples, transitions from one life cycle stage to another are staged and require a reset of electronic device 101 (e.g., a device reset, reboot, or power cycle) to effectuate the transition to the new life cycle stage. According to an example, the RAW life cycle stage may correspond to the time when the silicon is in transit from the foundry where it was fabricated to the manufacturer (OEM). The MFG life cycle stage may correspond to the time when the silicon is in the manufacturer's possession, e.g., during manufacturer provisioning of the device. The remaining life cycle stages (DEV, PROD, FA, EOL) may correspond to the time when the silicon is in the customer's possession.

Figure 4:
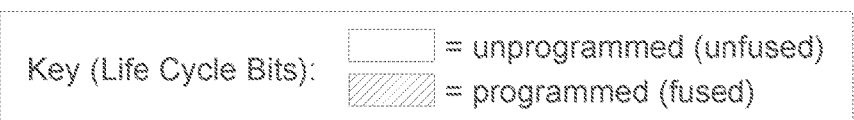
FIG. 4 illustrates an example of a life cycle bit map for an example set of nine (9) life cycle OTP bits.

FIG. 4 illustrates an example of a life cycle bit map for an example set of nine (9) life cycle bits (bits 0-8), for example, where respective life cycle bit maps 203a-203f may correspond to life cycle bits 203 in OTP memory 110 of FIG. 2. The life cycle bit maps 203a-203f may specify six (6) life cycle OTP bit patterns (404a-404f) for the nine (9) life cycle bits, respective OTP bit patterns corresponding with a respective defined life cycle stage in the series of life cycle stages 408. As illustrated in this example, life cycle OTP bit pattern 404a in life cycle bit map 203a may correspond to life cycle stage RAW illustrated directly below life cycle bit map 203a. Similarly, life cycle OTP bit pattern 404b in life cycle bit map 203b may correspond to life cycle stage MFG illustrated directly below life cycle bit map 203b. The other illustrated life cycle OTP bit patterns (e.g., 404c-404f in life cycle bit maps 203c-203f) may correspond with the life cycle stage illustrated directly below them.

As illustrated in FIG. 4, life cycle bit map 203a may correspond to life cycle OTP bit pattern 404a for the RAW life cycle stage (i.e., bits 0-8 unprogrammed). Life cycle bit map 203b may correspond to life cycle OTP bit pattern 404b for the MFG life cycle stage (i.e., bits 0 and 2 programmed; bits 1 and 3-8 unprogrammed). Life cycle bit map 203c may correspond to life cycle OTP bit pattern 404c for the DEV life cycle stage (i.e., bits 0 and 2-4 programmed; bits 1 and 5-8 unprogrammed). Life cycle bit map 203d may correspond to life cycle OTP bit pattern 404d for the PROD life cycle stage (i.e., bits 0, 2, and 4-5 programmed; bits 1, 3, and 6-8 unprogrammed). Life cycle bit map 203e may correspond to life cycle OTP bit pattern 404e for the FA life cycle stage (i.e., bits 0, 2-6, and 8 programmed; bits 1 and 7 unprogrammed). Life cycle bit map 203f may correspond to life cycle OTP bit pattern 404f for the EOL life cycle stage (i.e., bits 0-8 programmed).

In an example, electronic device 101 may be designed so that boot code 140 may have exclusive write access to life cycle bits 203. In this manner, boot code 140 may selectively program the life cycle bits over time, e.g., in response to commands, to advance the electronic device through the series of life cycle stages in a one-way manner. For example, after boot code 140 programs life cycle bits 203 with the life cycle OTP bit pattern 404b corresponding to the MFG life cycle stage, transition 410 from the MFG life cycle stage back to the RAW life cycle stage may be prohibited because it is not possible to "un-program" life cycle bits 0 and 2 (OTP memory may be permanently programmed). Thus, as illustrated by example life cycle OTP bit patterns 404a-404f in life cycle bit maps 203c-203f, electronic device 101 may be limited to advancing through life cycle stages in a one-way manner, i.e., from left to right in FIG. 4.

Figure 5:
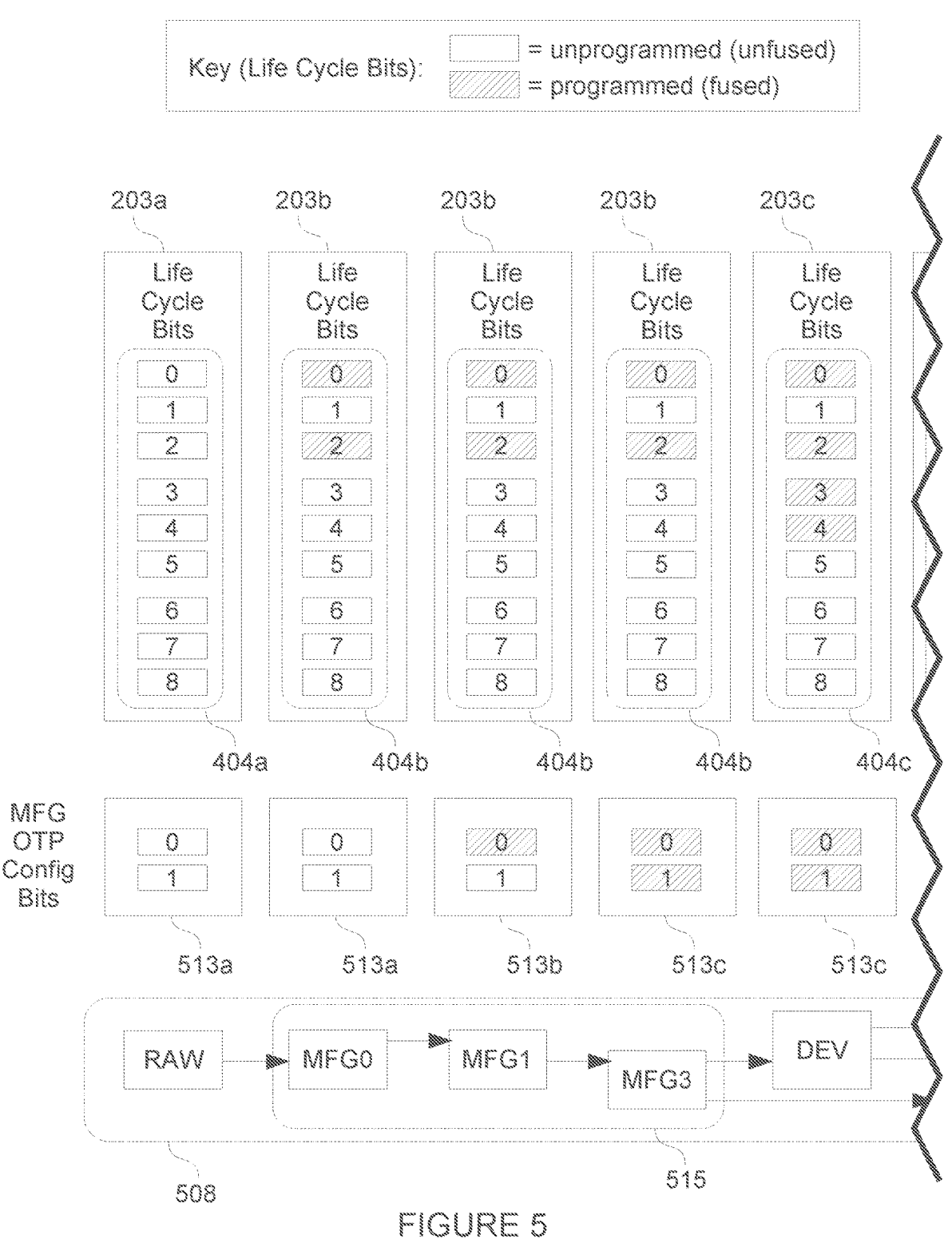
FIG. 5 illustrates an example of using manufacturer OTP configuration bits for sub-stages of the life cycle stages defined for an electronic device.

FIG. 5 illustrates an example of using manufacturer OTP configuration bits for sub-stages of the life cycle stages defined for electronic device 101. For example, the manufacturer may desire to provision the electronic device in a staged manner in order to limit access to certain features or functions of the electronic device during provisioning. In the illustrated example, the manufacturer may define sub-stages 515 (MFG0, MFG1, and MFG3), which may correspond, respectively, to unique states of manufacturer OTP configuration bits in 513a-513c. In this example, life cycle OTP bit patterns 404a-404f in life cycle bit maps 203a-203f may correspond to those depicted in FIG. 4. Similarly, defined life cycle stages in the series of life cycle stages 508 may correspond to those in 408, except that sub-stages 515 correspond to the MFG stage in 408. Thus, while the electronic device is in the MFG life cycle stage (life cycle OTP bit pattern 404b, life cycle bit map 203b), sub-stages 515 may be defined by programming manufacturer OTP configuration bits stored in manufacturer configuration information 213 of OTP memory 110 (FIG. 2). In an example, electronic device 101 may be designed so that boot code 140 may have exclusive write access to manufacturer OTP configuration bits in manufacturer configuration information 213. In another example, electronic device 101 may be designed so that other code (manufacturer code) may have write access to manufacturer OTP configuration bits in manufacturer configuration information 213. In yet another example, a manufacturer may program manufacturer OTP configuration bits in manufacturer configuration information 213 via external hardware (e.g., JTAG debug interface). As illustrated, sub-stages 515 may be limited to advancing in a one-way manner because it is not possible to "un-program" the manufacturer OTP configuration bits (OTP memory may be permanently programmed).

Although FIG. 5 illustrates an example of defining sub-stages for the MFG life cycle stage, a similar approach may be used to define sub-stages for other life cycle stages of the electronic device. For example, a customer may desire sub-stages during development (DEV life cycle stage) in order to limit access to certain features or functions of the electronic device. To achieve this, the customer may define customer configuration bits in customer information 223 of OTP memory 110 to define sub-stages (e.g., similar to sub-stages 515). Customer configuration bits may be used by customer code to limit access to certain features or functions of the electronic device.

Figure 6:
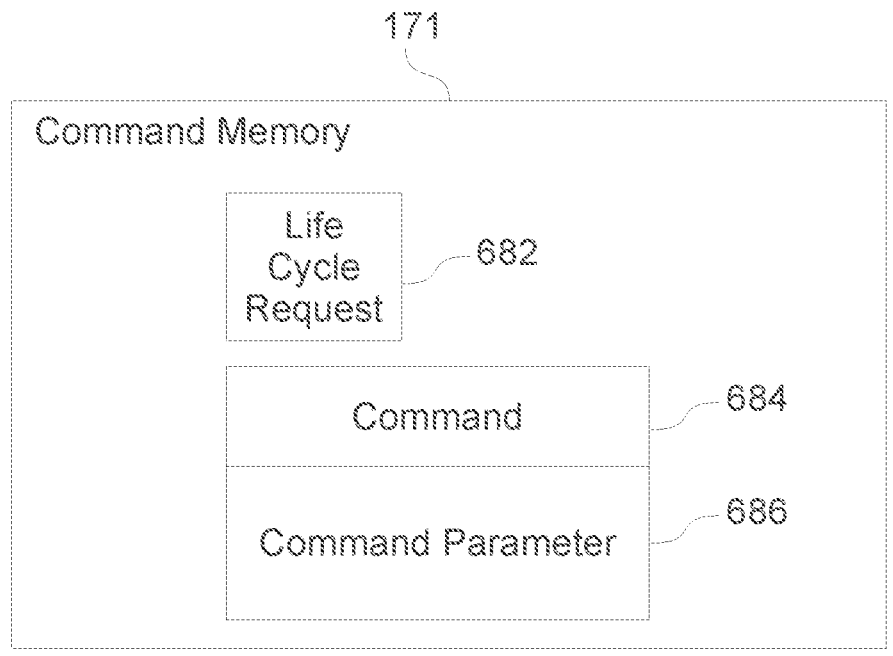
FIG. 6 illustrates an example command memory.

FIG. 6 illustrates an example command memory 171. Command memory 171 may comprise rewritable memory (e.g., registers) and may contain Life Cycle Request bit 682, command region 684, and command parameter region 686. In an example, Life Cycle Request bit 682, command region 684, and command parameter region 686 may be used (individually or in any combination) to initiate requests to be processed by boot code 140. In an example, command memory 171 may be user-accessible so that code other than boot code 140 (e.g., manufacturer code, customer code) may initiate requests to be processed by boot code 140. In another example, command memory 171 may be accessed via external hardware (e.g., JTAG debug interface, UART interface, I2C interface).

In an example, Life Cycle Request bit 682, when set, may correspond to a request to transition electronic device 101 from a current life cycle stage to a next life cycle stage. In the same or another example, command region 684 may be programmed with commands corresponding to functions that boot code 140 may perform (e.g., functions F1, F2 illustrated as 145a and 145b in FIG. 1). Command parameter region 686 may be programmed with parameters corresponding to a command programmed into region 684.

Figure 7:
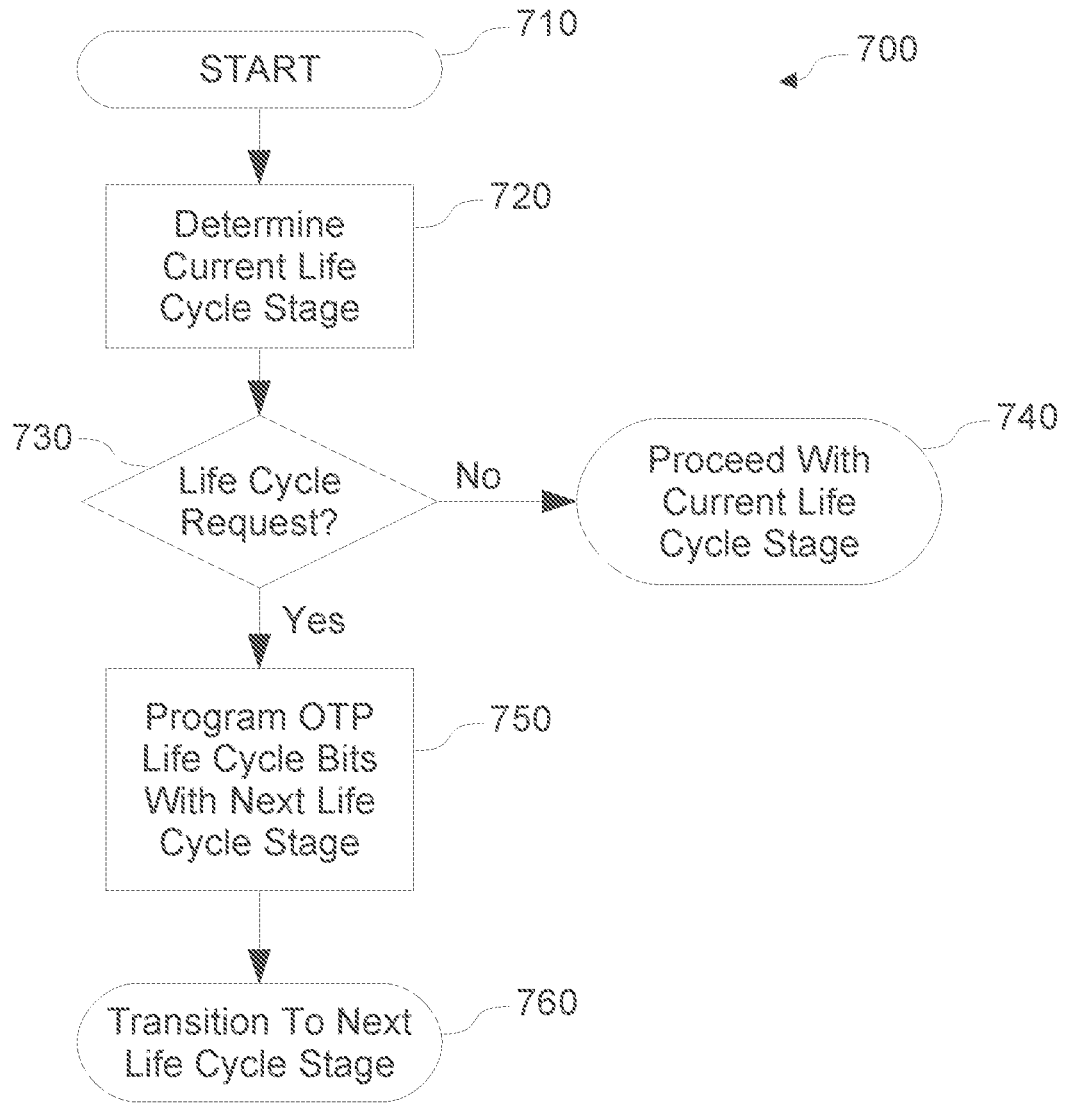
FIG. 7 illustrates a flow chart of an example method for managing the life cycle of an electronic device through secure programming of OTP memory of the electronic device.

FIG. 7 illustrates a flow chart of an example method 700 for managing the life cycle of an electronic device through secure programming of OTP memory of the electronic device. According to one example, method 700 may begin at block 710. In an example, method 700 may be performed by boot code 140. In some examples, starting block 710 may represent a time when electronic device 101 is first powered up or a time following a reset of the electronic device (e.g., a device reset, a reboot, or a power cycle). Thus method 700 may be performed by boot code 140 at a time when OTP memory 110 is not user-accessible (e.g., because user code has not yet been loaded). Teachings of the present disclosure may be implemented in a variety of configurations of system 100. As such, the initialization point for method 700 and the order of 710-760 comprising method 700 may depend on the implementation chosen.

At block 720, boot code may determine the current life cycle stage (LCS) of electronic device 101 by reading life cycle bits 203 from OTP memory 110. At block 730, boot code may determine if there is a pending life cycle request, for example, by checking if Life Cycle Request bit 682 in command memory 171 is set. If there is no pending life cycle request, boot code may proceed to block 740, taking whatever actions are appropriate for the current life cycle stage. If boot code determines at block 730 that a life cycle request is pending, boot code may proceed to block 750. In block 750, boot code may program life cycle bits 203 with the life cycle OTP bit pattern (e.g., 404a-404f in FIG. 4) corresponding to the next life cycle stage. Following programming, the boot code may proceed to block 760 and transition to the next life cycle stage.

Although FIG. 7 discloses a particular number of operations related to method 700, method 700 may be executed with greater or fewer operations than those depicted in FIG. 7. For example, prior to block 750, boot code may determine the next life cycle stage based on, for example, OTP configuration bits. Also prior to block 750, boot code may generate the life cycle bit pattern corresponding to the next life cycle stage. In another example, at block 760, boot code may cause a transition to the next life cycle stage by forcing a reset of electronic device 101. In addition, although FIG. 7 discloses a certain order of operations to be taken with respect to method 700, the operations comprising method 700 may be completed in any suitable order.

Figure 8:
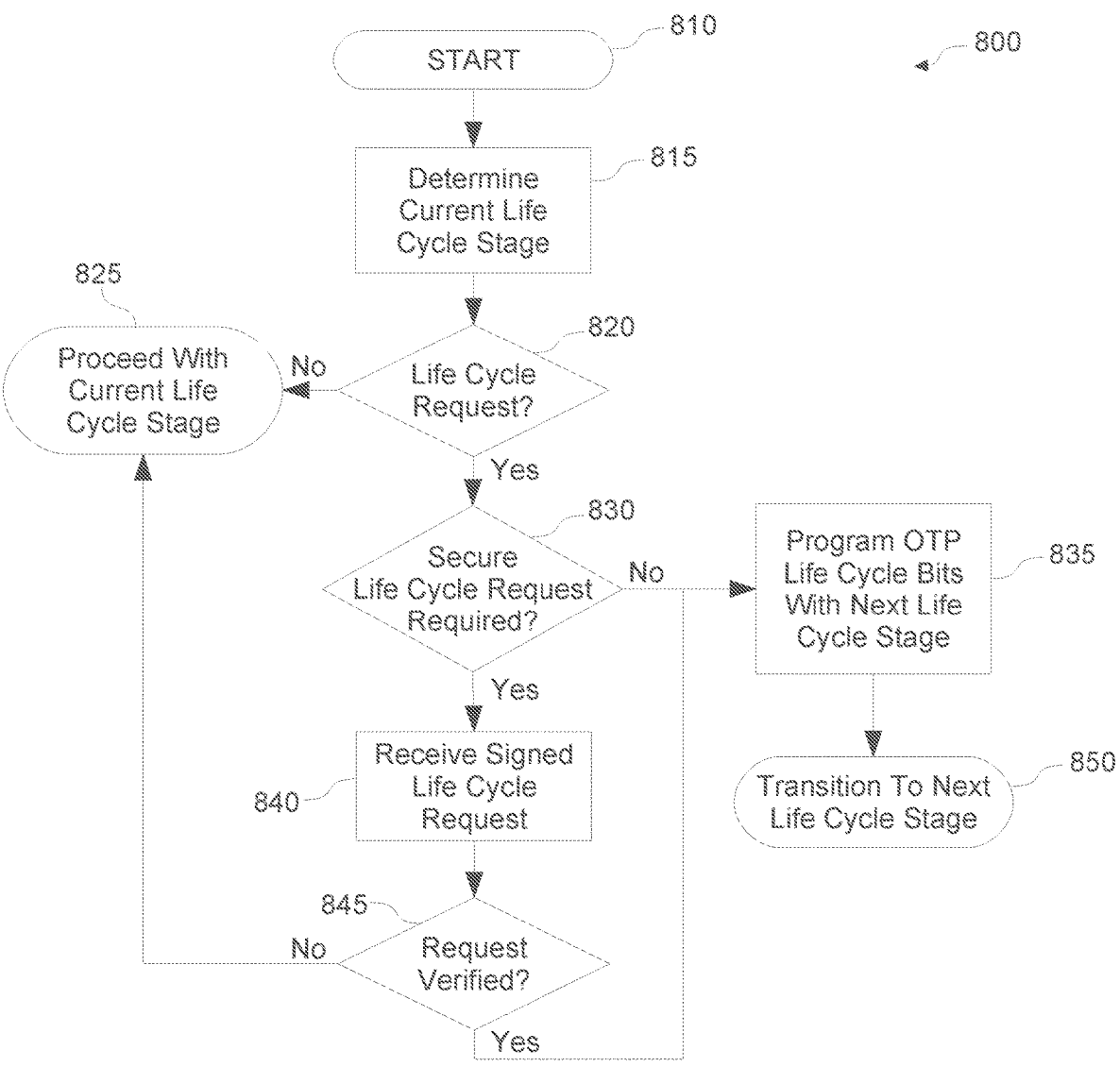
FIG. 8 illustrates a flow chart of an example method for managing the life cycle of an electronic device through secure programming of OTP memory of the electronic device.

FIG. 8 illustrates a flow chart of an example method 800 for managing the life cycle of an electronic device through secure programming of OTP memory of the electronic device. According to one example, method 800 may begin at block 810. In an example, method 800 may be performed by boot code 140. In some examples, starting block 810 may represent a time when electronic device 101 is first powered up or a time following a reset of the electronic device (e.g., a device reset, a reboot, or a power cycle). Thus method 800 may be performed by boot code 140 at a time when OTP memory 110 is not user-accessible (e.g., because user code has not yet been loaded). Teachings of the present disclosure may be implemented in a variety of configurations of system 100. As such, the initialization point for method 800 and the order of 810-850 comprising method 800 may depend on the implementation chosen.

In method 800, blocks 810, 815, and 820 may correspond, respectively, to blocks 710, 720, and 730, except that when boot code determines there is a life cycle request pending in block 820, it may proceed to block 830 where boot code determines whether a secure life cycle request is required. In some examples, the manufacturer may desire secure programming of the OTP life cycle bits 203 so that a malicious user cannot cause an irreversible life cycle transition. According to these examples, the boot code may require the user provide a signed life cycle request command, which may be signed with a cryptographic key of a public key pair. The boot code may have access to the other half of the key pair in order to verify the signed command. In block 830, if boot code determines a secure life cycle request is not required, it may proceed to blocks 835 and 850, which may correspond, respectively, to blocks 750 and 760 of method 700.

If boot code determines in block 830 that a secure life cycle request is required, it may proceed to block 840 where it may receive a signed life cycle request from the user. The command may be received from command region 684 from command memory 171 illustrated in FIG. 6. The command may include parameters from command parameter region 686. As discussed with respect to FIG. 6, a user may write the secure life cycle request command into command memory 171 via firmware (e.g., customer code) or via a physical interface (e.g., JTAG debug interface, UART interface, I2C interface). After receiving the signed life cycle request at block 840, boot code my proceed to block 845. In block 845, boot code may verify the signed life cycle request, for example, by using a secret cryptographic key that is the second half of the key pair the user used to sign the request. If the boot code verifies the request, it may proceed to blocks 835 (then 850), as described above. If the signed life cycle request fails verification, boot code may proceed to block 825, where the current life cycle stage resumes without a transition to the next life cycle stage.

Although FIG. 8 discloses a particular number of operations related to method 800, method 800 may be executed with greater or fewer operations than those depicted in FIG. 8. For example, if the signed life cycle request fails verification in block 845, the boot code may proceed back to block 840 so that the user may make a second attempt at submitting a signed life cycle request command. In another example, boot code may allow a limited number of attempts before locking the command memory (e.g., for a predefined amount of time). In some examples, the additional operations described with respect to method 700 may equally be performed in method 800. In addition, although FIG. 8 discloses a certain order of operations to be taken with respect to method 800, the operations comprising method 800 may be completed in any suitable order.

FIGS. 9a-9f illustrate a flow chart of an example method 900 for managing the life cycle of an electronic device through secure programming of OTP memory of the electronic device. According to one example, method 900 may begin at block 902 in FIG. 9a. In an example, method 900 may be performed by boot code 140. In some examples, starting block 902 may represent a time when electronic device 101 is first powered up or a time following a reset of the electronic device (e.g., a device reset, a reboot, or a power cycle). Thus method 900 may be performed by boot code 140 at a time when OTP memory 110 is not user-accessible (e.g., because user code has not yet been loaded). Teachings of the present disclosure may be implemented in a variety of configurations of system 100. As such, the initialization point for method 900 and the order of 902-984 comprising method 900 may depend on the implementation chosen.

At block 904, boot code may determine the current life cycle stage (LCS) of electronic device 101. At block 906, boot code may determine if the LCS is the RAW life cycle stage. If so, boot code may proceed to block 908 and stop executing code. For example, by stopping the execution of code, boot code may not load any code images so that no features or capabilities are enabled on the electronic device. This feature may deter theft of silicon while it is in transit from the foundry to the manufacturer (e.g., RAW life cycle stage in FIG. 3). If boot code determines at block 906 that the current LCS is not the RAW life cycle stage, it may proceed to block 910 (continued in FIG. 9*b*). In this example, boot code may be unable to cause a transition from the RAW LCS to the MFG LCS. The manufacturer may cause a transition from the RAW LCS to the MFG LCS using an external tester to program the life cycle OTP bit pattern corresponding to the MFG LCS (e.g., 404*b* in FIG. 4) into life cycle bits 203 in OTP memory 110. In other examples, boot code 104 may program the life cycle OTP bit pattern corresponding to the MFG LCS (e.g., 404*b*) into life cycle bits 203, for example, in response to determining one or more external pins (e.g., 180-1, 180-2, . . . 180-N in FIG. 1) is/are in a predefined state.

Figure 9A:
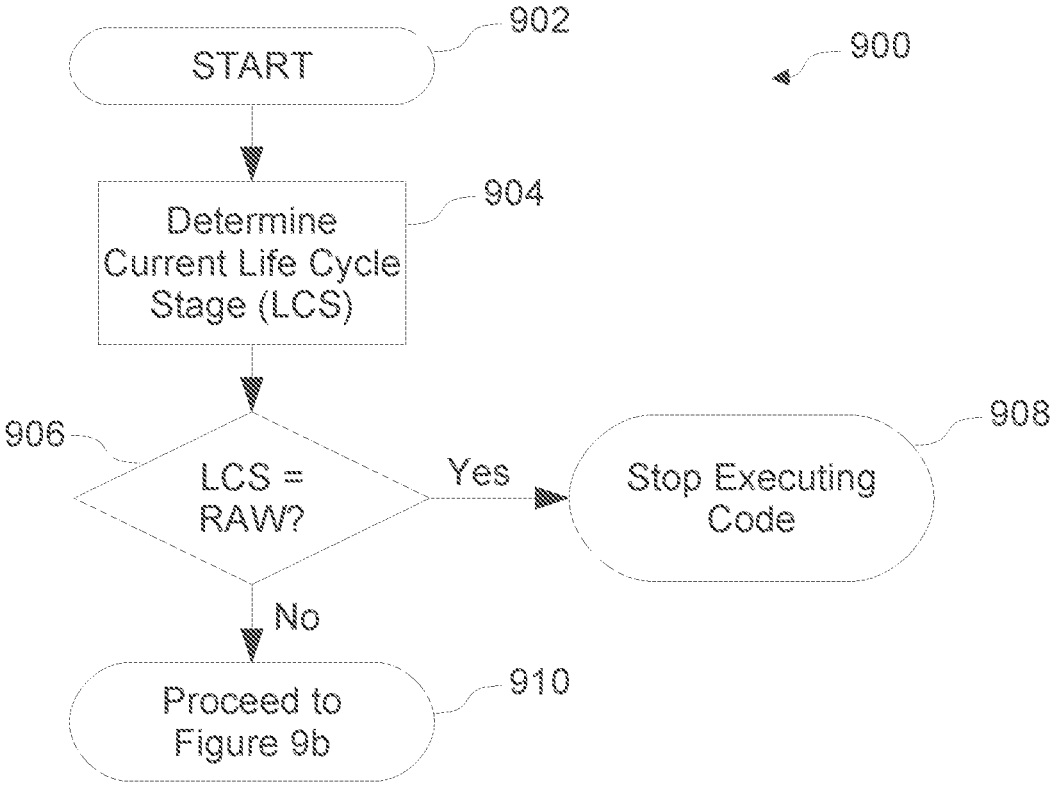
FIGS. 9a-9f illustrate a flow chart of an example method for managing the life cycle of an electronic device through secure programming of OTP memory of the electronic device.
Figure 9B:
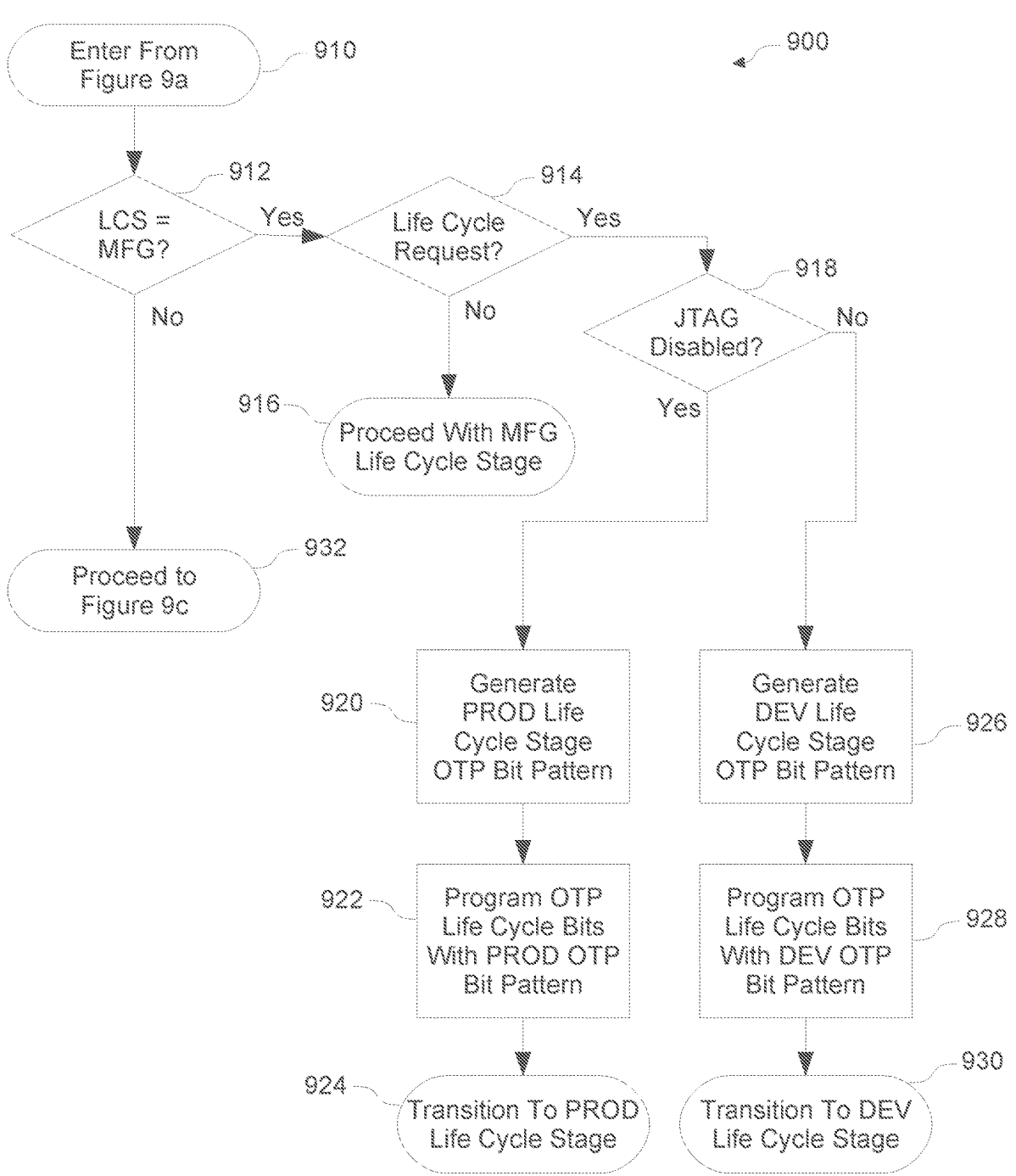

FIG. 9*b* may begin at block 910 and proceed to block 912. In block 912, boot code may determine if the LCS is the MFG life cycle stage. If so, boot code may proceed to block 914 where it may determine if there is a pending life cycle request (e.g., as described for FIGS. 7 and 8). If no life cycle request is pending, boot code may proceed to block 916, where the current MFG life cycle stage resumes without a transition to another life cycle stage. If, at block 914, boot code determines there is a life cycle request pending, boot code may proceed to block 918. At block 918, boot code may determine whether the JTAG capabilities of electronic device 101 have been disabled. In one example, boot code makes this determination by reading configuration information from manufacturer configuration information region 213 of OTP memory 110. In this example, the manufacturer may determine that a transition from MFG LCS to PROD LCS is allowable if JTAG is disabled. Thus, the boot code may enforce this restriction at block 918.

Figure 12:
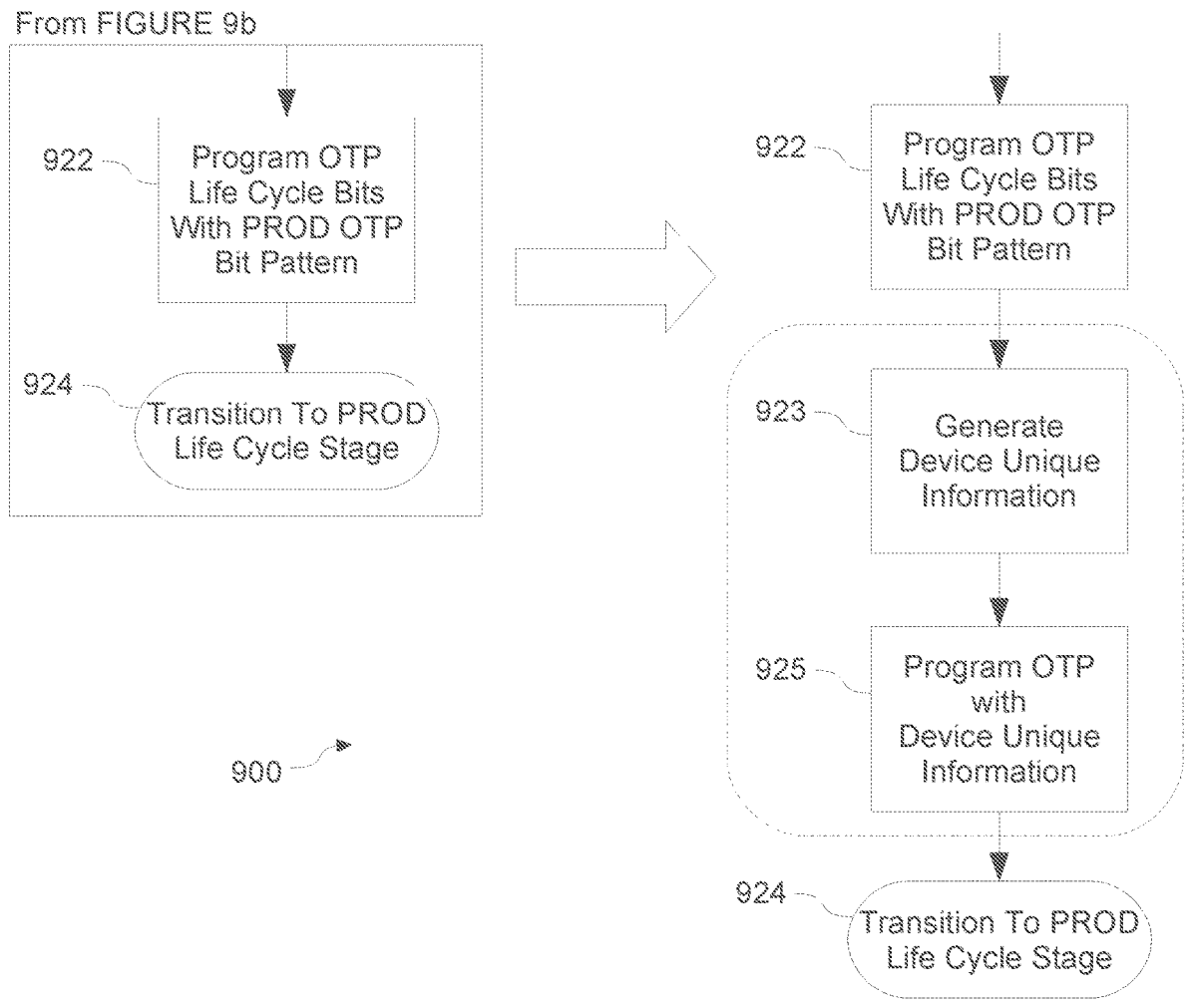
FIG. 12 illustrates a flow chart of additional example operations for managing the life cycle of an electronic device through secure programming of OTP memory of the electronic device.

If it determined that JTAG is disabled, boot code may proceed to block 920. In block 920, boot code may generate the PROD life cycle OTP bit pattern (e.g., 404*d* in FIG. 4). Thereafter, boot code may proceed to block 922 and program the OTP life cycle bits 203 in OTP memory 110 with PROD life cycle OTP bit pattern (e.g., 404*d*). Boot code may then proceed to block 924 and transition to the PROD LCS. In an example, at block 924, boot code may cause a transition to the PROD life cycle stage by forcing a reset of electronic device 101. At block 924, boot code may perform other operations corresponding to a transition to the PROD life cycle stage (e.g., as illustrated in FIG. 12).

If it determined at block 918 that JTAG is not disabled, boot code may proceed to block 926. In block 926, boot code may generate the DEV life cycle OTP bit pattern (e.g., 404*c* in FIG. 4). Thereafter, boot code may proceed to block 928 and program the OTP life cycle bits 203 in OTP memory 110 with DEV life cycle OTP bit pattern (e.g., 404*c*). Boot code may then proceed to block 930 and transition to the DEV LCS. In an example, at block 930, boot code may cause a transition to the DEV life cycle stage by forcing a reset of electronic device 101. At block 930, boot code may perform other operations corresponding to a transition to the DEV life cycle stage.

Figure 9C:
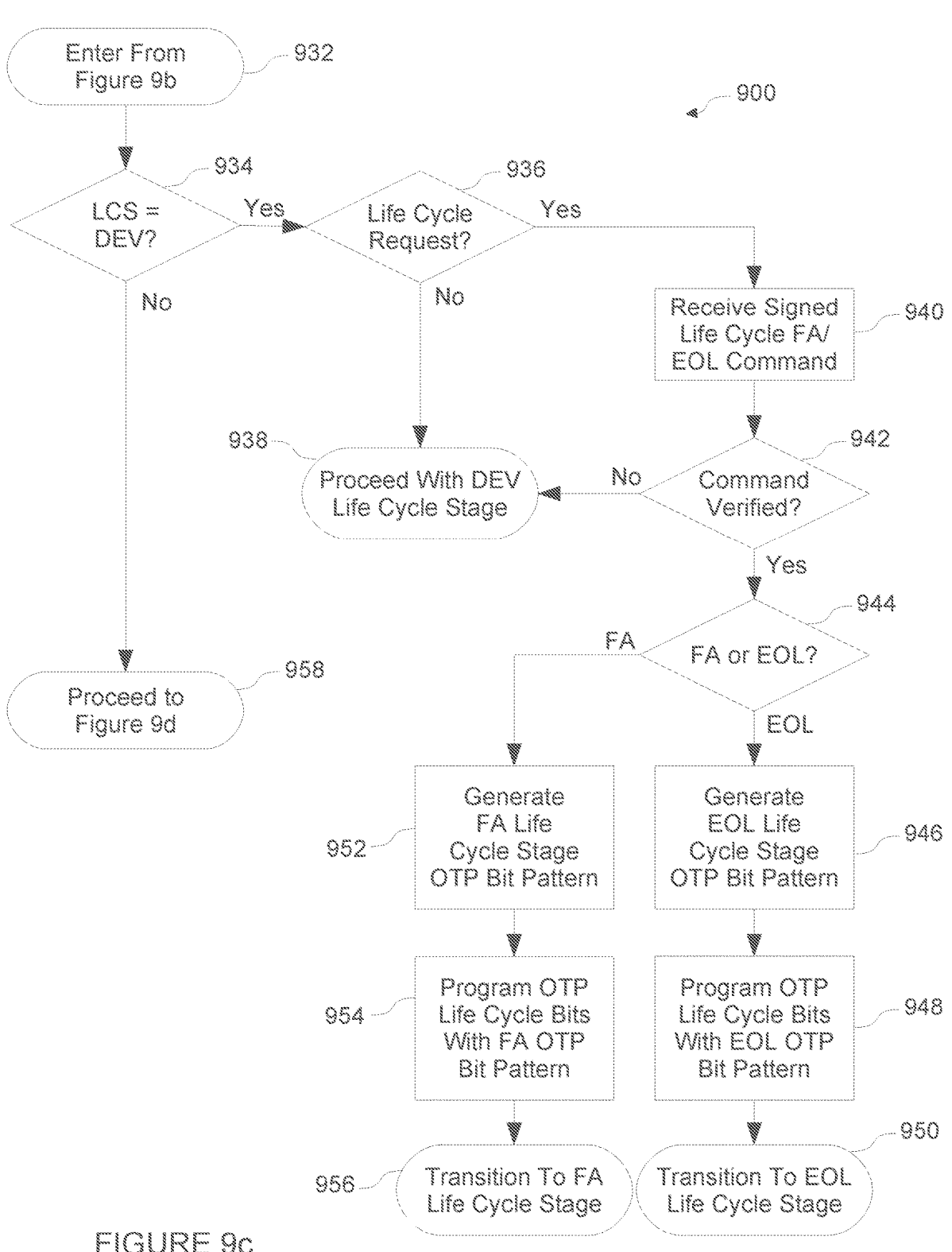

In block 912, if boot code determines the LCS is not the MFG life cycle stage, boot code may proceed to block 932 (continued at FIG. 9*c*).

Figure 10:
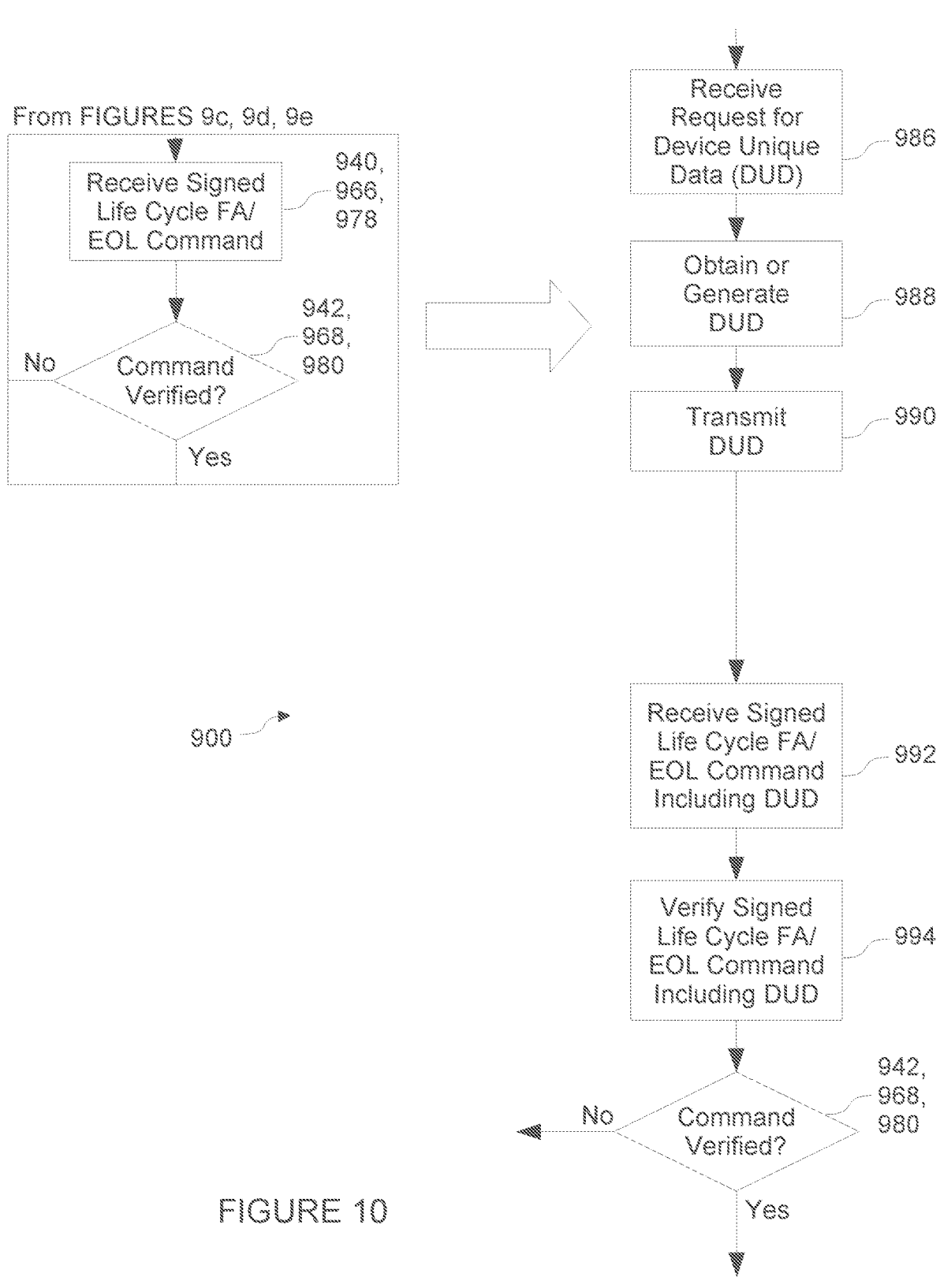
FIG. 10 illustrates a flow chart of additional example operations for managing the life cycle of an electronic device through secure programming of OTP memory of the electronic device.
Figure 11:
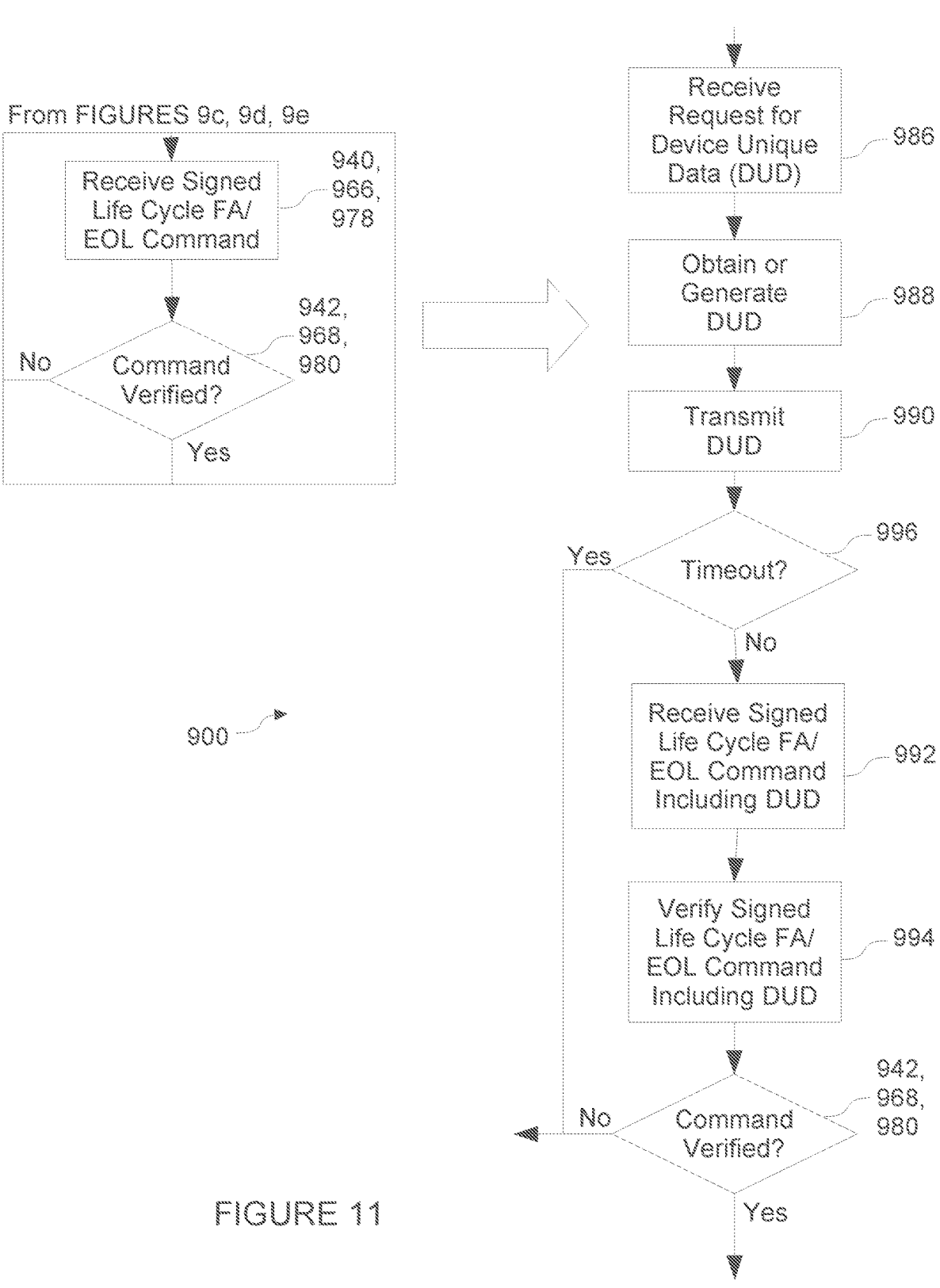
FIG. 11 illustrates a flow chart of additional example operations for managing the life cycle of an electronic device through secure programming of OTP memory of the electronic device.

FIG. 9*c* may begin at block 932 and proceed to block 934. In block 934, boot code may determine if the LCS is the DEV life cycle stage. If so, boot code may proceed to block 936 where it may determine if there is a pending life cycle request (e.g., as described for FIGS. 7 and 8). If no life cycle request is pending, boot code may proceed to block 938, where the current DEV life cycle stage resumes without a transition to another life cycle stage. If, at block 936, boot code determines there is a life cycle request pending, boot code may proceed to block 940. Blocks 940 and 942 may operate like blocks 840 and 845 in FIG. 8. In this example, the transition from the DEV LCS to either the FA or EOL LCS may require a secure life cycle request which may be a signed life cycle FA/EOL command. In an example, verification of the received request/command may proceed as described for block 845 in FIG. 8. In other examples, verification of the received request/command may proceed as illustrated in FIGS. 10 and 11. If verification (in block 942) of the received request/command fails, boot code may proceed to block 938. In other examples (not illustrated), boot code may proceed to block 940 to receive additional signed life cycle FA/EOL command attempts.

If verification (in block 942) of the received request/command is successful, boot code may proceed to block 944. In block 944, boot code may determine whether the signed life cycle FA/EOL command indicated a transition to FA LCS or EOL. For example, the signed life cycle FA/EOL command may have originated from command memory 171 and may include a command parameter 686 that may indicate which transition is desired. In other examples, configuration information in OTP memory 110 (e.g., in manufacturer configuration information region 213 or customer information region 223) may indicate which transition is desired.

If boot code determines in block 944 to make a transition to FA LCS, boot code may proceed to block 952. In block 952, boot code may generate the FA life cycle OTP bit pattern (e.g., 404*e* in FIG. 4). Thereafter, boot code may proceed to block 954 and program the OTP life cycle bits 203 in OTP memory 110 with FA life cycle OTP bit pattern (e.g., 404*e*). Boot code may then proceed to block 956 and transition to the FA LCS. In an example, at block 956, boot code may cause a transition to the FA life cycle stage by forcing a reset of electronic device 101. At block 956, boot code may perform other operations (not illustrated) corresponding to a transition to the FA life cycle stage. In one example, boot code may effectively erase all secrets stored in OTP memory (e.g., by programming all bits in OTP memory) and erase all memory. In this example, a customer may be returning a part to the manufacturer for failure analysis and would not want the manufacturer to have access to the customer's secrets.

If boot code determines in block 944 to make a transition to EOL LCS, boot code may proceed to block 946. In block 946, boot code may generate the EOL life cycle OTP bit pattern (e.g., 404*f* in FIG. 4). Thereafter, boot code may proceed to block 948 and program the OTP life cycle bits 203 in OTP memory 110 with EOL life cycle OTP bit pattern (e.g., 404*f*). Boot code may then proceed to block 950 and transition to the EOL LCS. In an example, at block 950, boot code may cause a transition to the EOL life cycle stage by forcing a reset of electronic device 101. At block 950, boot code may perform other operations (not illustrated) corresponding to a transition to the EOL life cycle stage. In one example, boot code may effectively erase all secrets stored in OTP memory (e.g., by programming all bits in OTP memory) and erase all memory so that the part need not be physically destroyed to protect the manufacturer and customer secrets.

Figure 9D:
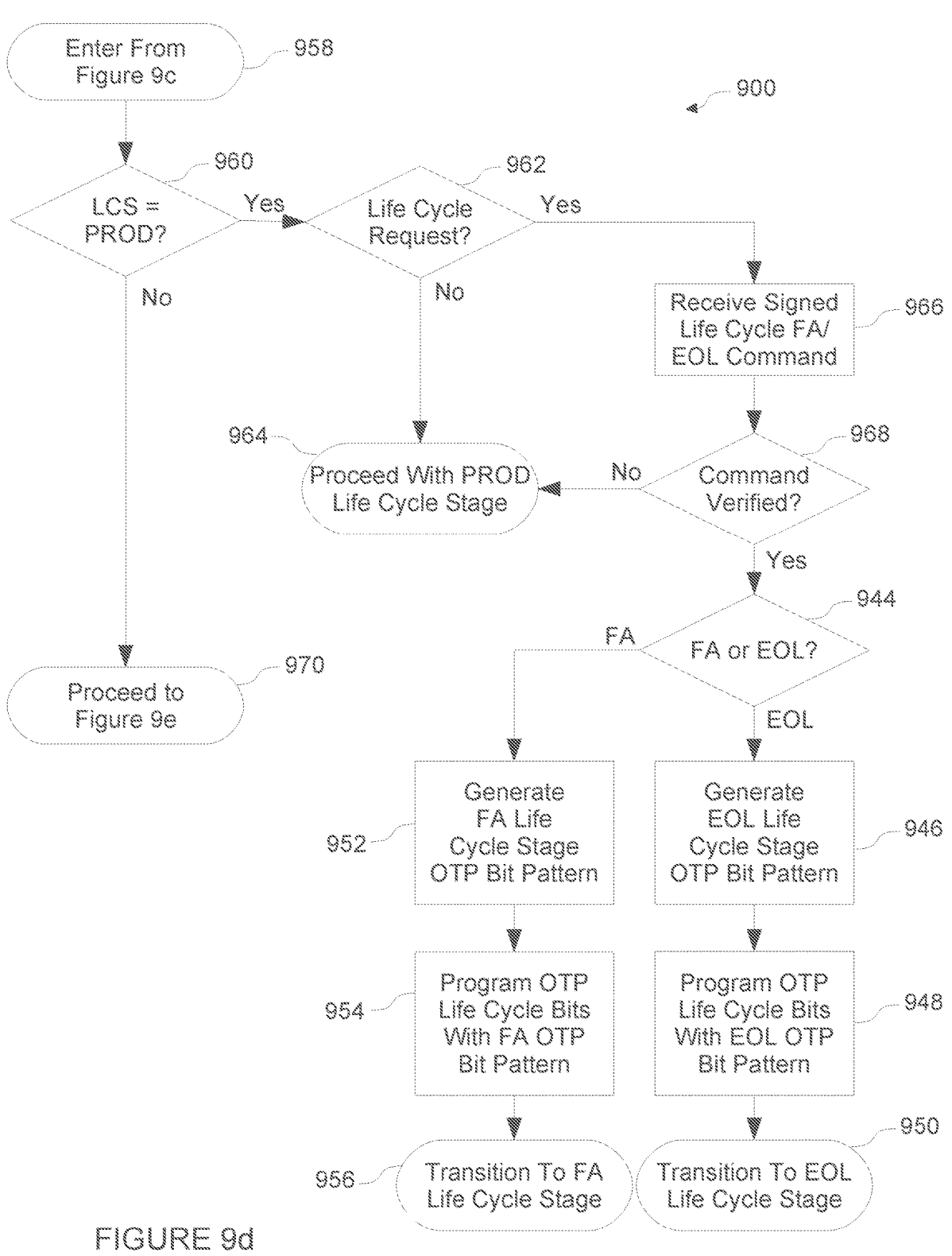

In block 934, if boot code determines the LCS is not the DEV life cycle stage, boot code may proceed to block 958 (continued at FIG. 9d).

FIG. 9d may begin at block 958 and proceed to block 960. In block 960, boot code may determine if the LCS is the PROD life cycle stage. If so, boot code may proceed to block 962 where it may determine if there is a pending life cycle request (e.g., as described for FIGS. 7 and 8). If no life cycle request is pending, boot code may proceed to block 964, where the current PROD life cycle stage resumes without a transition to another life cycle stage. If, at block 962, boot code determines there is a life cycle request pending, boot code may proceed to block 966. Blocks 966 and 968 may operate like blocks 840, 940 and 845, 942 (respectively in FIGS. 8 and 9c), except that if verification fails in block 968, boot code may proceed to block 964. Blocks 944, 946, 948, 950, 952, 954, and 956 in FIG. 9d are described with the same-numbered blocks in FIG. 9c.

Figure 9E:
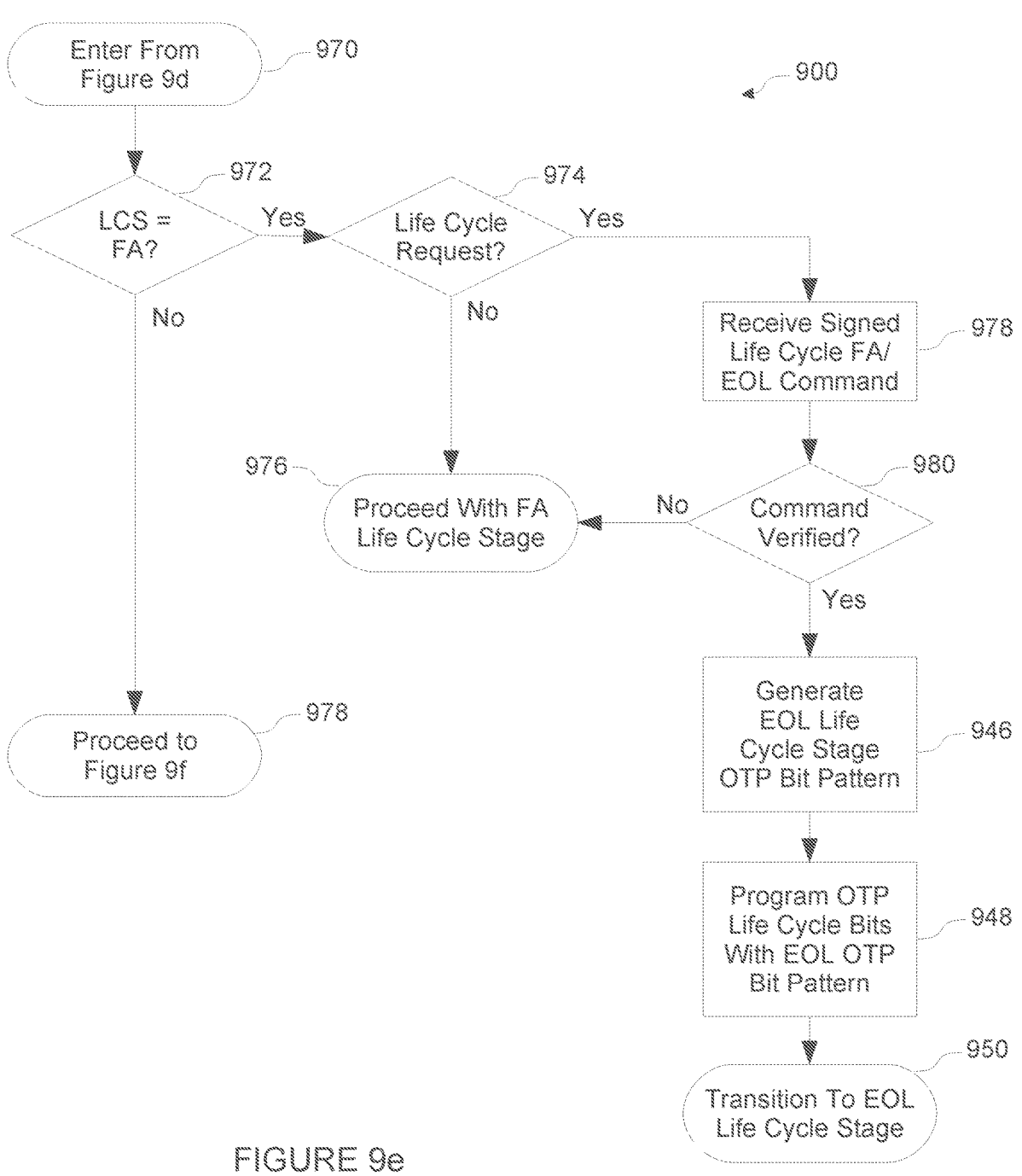

In block 960, if boot code determines the LCS is not the PROD life cycle stage, boot code may proceed to block 970 (continued at FIG. 9e).

FIG. 9e may begin at block 970 and proceed to block 972. In block 972, boot code may determine if the LCS is the FA life cycle stage. If so, boot code may proceed to block 974 where it may determine if there is a pending life cycle request (e.g., as described for FIGS. 7 and 8). If no life cycle request is pending, boot code may proceed to block 976, where the current FA life cycle stage resumes without a transition to another life cycle stage. If, at block 974, boot code determines there is a life cycle request pending, boot code may proceed to block 978. Blocks 978 and 980 may operate like blocks 840, 940, 966 and 845, 942, 968 (respectively in FIGS. 8, 9c, and 9d), except that if verification fails in block 980, boot code may proceed to block 976. Blocks 946, 948, and 950 in FIG. 9e are described with the same-numbered blocks in FIG. 9c.

Figure 9F:
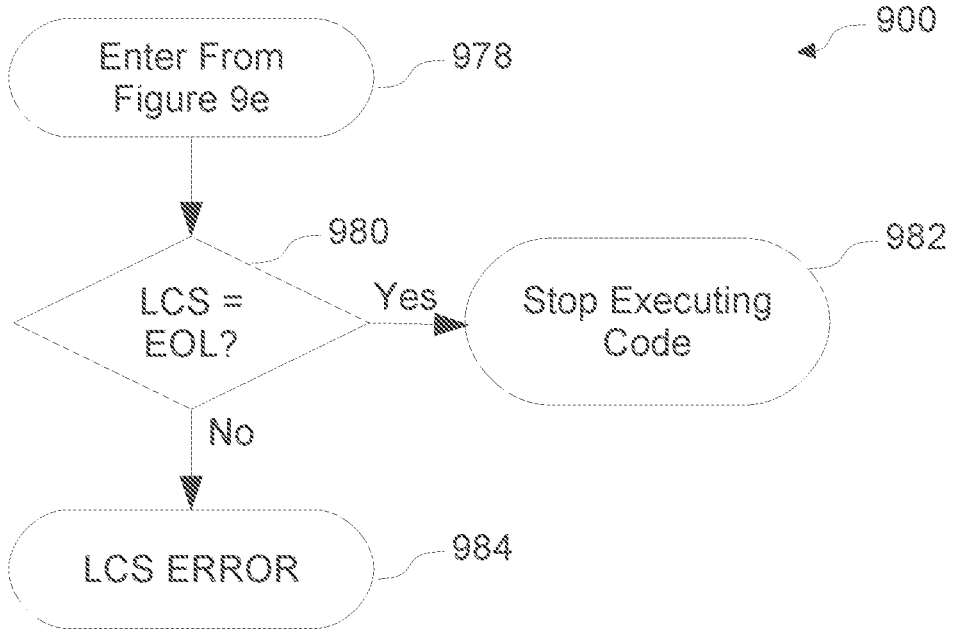

In block 972 if boot code determines the LCS is not the FA life cycle stage, boot code may proceed to block 978 (continued at FIG. 9f).

FIG. 9f may begin at block 978 and proceed to block 980. In block 980, boot code may determine if the LCS is the EOL life cycle stage. If so, boot code may proceed to block 982 and stop executing code. For example, by stopping the execution of code, boot code may not load any code images so that no features or capabilities are enabled on the electronic device. This may be the desired result for a part that has reached end of life (EOL). If, in block 980, boot code determines LCS is not the EOL life cycle stage, boot code may proceed to block 984. As illustrated, block 984 may be an LCS error state because the LCS does not match any of the six (6) defined life cycle stages for example electronic device 101. Alternatively, because the error condition is unexpected, boot code may transition from block 984 back to block 902 in FIG. 9a and re-run method 900.

Although FIGS. 9a-9f disclose a particular number of operations related to method 900, method 900 may be executed with greater or fewer operations than those depicted in FIGS. 9a-9f, e.g., those described above and others. FIGS. 10-12 provide additional examples of method 900 having more operations than those depicted in FIGS. 9a-9f. In addition, although FIGS. 9a-9f disclose a certain order of operations to be taken with respect to method 900, the operations comprising method 900 may be completed in any suitable order.

FIG. 10 illustrates a flow chart of additional example operations for method 900 for managing the life cycle of an electronic device through secure programming of OTP memory of the electronic device. FIG. 10 illustrates an example of additional operations that boot code 140 may perform when receiving and verifying a signed life cycle FA/EOL command, as described with respect to blocks 940, 966, 978 and 942, 968, 980 of FIGS. 9c, 9d, 9e. In this example, a manufacturer may enhance the security related to transitions to the FA or EOL life cycle stages. Thus, blocks 940, 966, 978 and 942, 968, 980 of FIGS. 9c, 9d, 9e may be replaced with blocks 986-994 and 942, 968, 980 of FIG. 10.

At block 986, boot code may receive a request for device unique data (DUD). At block 988, boot code may obtain or generate the requested DUD. In an example, DUD may include a random number. In another example, DUD may include a serial number or other secret device-unique information 233 that may be stored in OTP memory 110 (see FIG. 2). At block 990, boot code may transmit the DUD to the user, e.g., via a physical interface (e.g., JTAG debug interface, UART interface, I2C interface). At block 992, boot code may receive a signed life cycle FA/EOL command that includes the DUD previously transmitted in block 990. At block 994, boot code may verify the signed life cycle FA/EOL command that includes the DUD. In an example, a life cycle FA/EOL command that does not include the DUD may fail verification, thus enhancing the security of the electronic device.

Although FIG. 10 discloses a particular number of operations related to method 900, method 900 may be executed with greater or fewer operations than those depicted in FIG. 10 (e.g., as illustrated in FIG. 11). In addition, although FIG. 10 discloses a certain order of operations to be taken with respect to method 900, the operations comprising method 900 may be completed in any suitable order.

FIG. 11 illustrates a flow chart of additional example operations for method 900 for managing the life cycle of an electronic device through secure programming of OTP memory of the electronic device. FIG. 11 illustrates the same operation as FIG. 10 with the addition of block 996. At block 996, boot code may implement a timeout period and determine if that period has elapsed. The timeout period may begin to run after the boot code transmits DUD in block 990. If the timeout period elapses before the boot code receives a signed life cycle FA/EOL command including the DUD (block 992), boot code may proceed as if the signed command failed verification. Thus, a user wishing to cause a transition to either FA or EOL life cycle stages may be required to begin the process again, including requesting DUD at block 986.

FIG. 12 illustrates a flow chart of additional example operations for method 900 for managing the life cycle of an electronic device through secure programming of OTP memory of the electronic device. FIG. 12 illustrates an example of additional operations that boot code 140 may perform between blocks 922 and 924 of FIG. 9b. In this example, boot code may proceed from block 922 to block 923. In block 923, boot code may generate device unique information. In block 925, boot code may program OTP memory 110 with the device unique information generated in block 923. In an example, device unique information may be a public cryptographic key, a ROM seed, or other device unique information. Although illustrated as operating between blocks 922 and 924, in an example, blocks 923 and 925 may operate between blocks 928 and 930 (FIG. 9*b*).

FIG. 13 illustrates a flow chart of an example method 1300 for managing the life cycle of an electronic device through secure programming of OTP memory of the electronic device. In an example, electronic device 101 may include life cycle function data specifying a set of available functions for respective life cycle stages. The specified set of available functions for a respective life cycle stage defines functions that may be performed during the respective life cycle stage of the electronic device. In FIG. 13, boot code may receive a command at block 1302. In an example, the command may be received from command memory 171 (e.g., FIG. 6). At block 1304, boot code may determine if the received command is a signed life cycle FA/EOL command. If so, boot code may proceed to block 1306 where boot code determines if the current life cycle stage is either the DEV LCS or PROD LCS. If so, boot code may proceed to block 1310 and process the received command. If the current life cycle stage is neither DEV or PROD, boot code may proceed to block 1308 and ignore the received command. In this manner, boot code may specify the set of available functions for respective life cycle stages. In this example, the signed life cycle FA/EOL command is not available in the RAW, MFG, FA, or EOL life cycle stages. Thus, while the electronic device is operating in a respective life cycle stage, the boot code may limit the available functions for that respective life cycle stage as defined by life cycle function data.

Methods 700-1300 may be implemented using system 100 or any other system operable to implement methods 700-1300. Although examples have been described above, other variations and examples may be made from this disclosure without departing from the spirit and scope of these disclosed examples.

The invention claimed is:

1. A system comprising:

an electronic device having a plurality of defined life cycle stages, the electronic device including a one-time-programmable (OTP) memory comprising a plurality of life cycle bits, wherein respective bit patterns of the plurality of life cycle bits correspond with respective life cycle stages of the plurality of defined life cycle stages;

a boot code stored in read only memory and executable by a processor to:

receive a request to transition from a current life cycle stage of the plurality of defined life cycle stages to a next life cycle stage of the plurality of defined life cycle stages; and in response to the received request, automatically generate a bit pattern corresponding to the next life cycle stage of the plurality of defined life cycle stages and program the bit pattern corresponding to the next life cycle stage of the plurality of defined life cycle stages in the OTP memory during a subsequent reset of the electronic device.

2. The system of claim 1, wherein the subsequent reset of the electronic device comprises a device reset, a reboot, or a power cycle of the electronic device.

3. The system of claim 1, wherein the boot code programming the bit pattern corresponding to the next life cycle stage of the plurality of defined life cycle states in the OTP memory causes a transition from the current life cycle stage of the plurality of defined life cycle stages to the next life cycle stage of the plurality of defined life cycle stages.

4. The system of claim 1, wherein the boot code is executable by the processor, in response to the received request, to automatically generate a device unique information and program the device unique information in the OTP memory during the time when the OTP memory is not user-accessible.

5. The system of claim 1, wherein for respective life cycle stages of the plurality of defined life cycle stages, the boot code makes available to the user a corresponding respective set of available functions performable during the respective life cycle stage of the plurality of defined life cycle stages.

6. The system of claim 5, wherein:

the respective set of available functions performable during a first life cycle stage of the plurality of defined life cycle stages includes a first function; and the respective set of available functions that performable during a second life cycle stage of the plurality of defined life cycle stages excludes the first function.

7. The system of claim 1, wherein the request to transition from a current life cycle stage of the plurality of defined life cycle stages to a next life cycle stage of the plurality of defined life cycle stages is received via a physical port of the electronic device or via a firmware loaded onto the electronic device.

8. The system of claim 1, wherein the request to transition from a current life cycle stage of the plurality of defined life cycle stages to a next life cycle stage of the plurality of defined life cycle stages comprises a signed command.

9. The system of claim 1, wherein the electronic device comprises a server, a device associated with a server, or a computing platform, and wherein the system comprises a secure boot controller for the server, a device associated with the server, or a computing platform.

10. The system of claim 1, wherein the boot code is executable by the processor to transition the electronic device to the next life cycle stage of the plurality of defined life cycle stages by forcing a reset of the electronic device after programming the bit pattern corresponding to the next life cycle stage of the plurality of defined life cycle stages in the OTP memory.

11. A system comprising:

an electronic device having a one-time-programmable (OTP) memory, the OTP memory including a plurality of life cycle OTP bits;

a life cycle bit map associated with a plurality of defined life cycle stages of the electronic device, the life cycle bit map specifying a plurality of life cycle OTP bit patterns, respective life cycle OTP bit patterns corresponding with respective life cycle stages of the electronic device;

a life cycle function data specifying a set of available functions for respective life cycle stages, wherein:

the specified set of available functions for respective life cycle stages defining functions performable during the respective life cycle stage of the electronic device; and the specified set of available functions for a respective first life cycle stage differs from the specified set of available functions for a respective second life cycle stage; and a boot code stored in read only memory and executable by a processor to manage the provisioning of the electronic device through a series of life cycle stages, including:

to receive a plurality of requests to advance the electronic device through the series of life cycle stages;

in response to respective received requests of the plurality of requests, to selectively program, during a subsequent reset of the electronic device, the plurality of life cycle OTP bits to advance the electronic device to a respective next stage of the series of life cycle stages; and while the electronic device is operating in the respective first life cycle stage, to allow access to only the set of available functions for the respective first life cycle stage as specified by the life cycle function data.

12. The system of claim 11, comprising:

the boot code executable by the processor to automatically generate a device unique information and program the device unique information in the OTP memory during a time when the OTP memory is not user-accessible.

13. The system of claim 11, wherein the boot code executable by the processor to selectively program the plurality of life cycle OTP bits to advance the electronic device to a respective next stage of the series of life cycle stages comprises boot code executable by the processor to selectively program, in response to a signed command, the plurality of life cycle OTP bits to advance the electronic device to a respective next stage of the series of life cycle stages.

14. A method comprising:

for an electronic device having a one-time-programmable (OTP) memory, a plurality of defined life cycle stages, and a plurality of defined functions, providing access to a first set of the plurality of defined functions while the electronic device is in a first life cycle stage of the plurality of defined life cycle stages;

receiving a request to transition the electronic device from the first life cycle stage of the plurality of defined life cycle stages to a second life cycle stage of the plurality of defined life cycle stages;

in response to the received request to transition the electronic device from the first life cycle stage of the plurality of defined life cycle stages to the second life cycle stage of the plurality of defined life cycle stages, transitioning the electronic device to the second life cycle stage of the plurality of defined life cycle stages by programming the OTP memory, during a first subsequent reset of the electronic device, with information corresponding to the second life cycle stage of the plurality of defined life cycle stages; and providing access to a second set of the plurality of defined functions while the electronic device is in the second life cycle stage of the plurality of defined life cycle stages.

15. The method of claim 14, wherein the first subsequent reset of the electronic device comprises a device reset, a reboot, or a power cycle of the electronic device.

16. The method of claim 14, comprising:

in response to the received request to transition the electronic device from the first life cycle stage of the plurality of defined life cycle stages to the second life cycle stage of the plurality of defined life cycle stages, automatically generating and programming a device-unique information in the OTP memory during a time when the OTP memory is not user-accessible.

17. The method of claim 14, wherein:

the first set of the plurality of defined functions includes a first function; and the second set of the plurality of defined functions excludes the first function.

18. The method of claim 14, comprising:

subsequent to transitioning the electronic device to the second life cycle stage of the plurality of defined life cycle stages, prohibiting transitioning the electronic device to the first life cycle stage of the plurality of defined life cycle stages.

19. The method of claim 14, wherein the request to transition the electronic device from the first life cycle stage of the plurality of defined life cycle stages to the second life cycle stage of the plurality of defined life cycle stages is received via a physical port of the electronic device or via a firmware loaded onto the electronic device.

20. The method of claim 14, wherein the request to transition the electronic device from the first life cycle stage of the plurality of defined life cycle stages to the second life cycle stage of the plurality of defined life cycle stages comprises a signed command.

21. The method of claim 14, comprising:

receiving a request to transition the electronic device from the second life cycle stage of the plurality of defined life cycle stages to a third life cycle stage of the plurality of defined life cycle stages;

in response to the received request to transition the electronic device from the second life cycle stage of the plurality of defined life cycle stages to the third life cycle stage of the plurality of defined life cycle stages, transitioning the electronic device to the third life cycle stage of the plurality of defined life cycle stages by programming the OTP memory, during a time when the OTP memory is not user-accessible, with information corresponding to the third life cycle stage of the plurality of defined life cycle stages; and providing access to a third set of the plurality of defined functions while the electronic device is in the third life cycle stage of the plurality of defined life cycle stages.

22. The method of claim 21, comprising:

subsequent to transitioning the electronic device to the third life cycle stage of the plurality of defined life cycle stages, prohibiting transitioning the electronic device to the second life cycle stage of the plurality of defined life cycle stages.

23. The method of claim 14, comprising:

causing a transition of the electronic device from the first life cycle stage of the plurality of defined life cycle stages to a second life cycle stage of the plurality of defined life cycle stages by forcing a reset of the electronic device after programming the OTP memory with information corresponding to the second life cycle stage of the plurality of defined life cycle stages.

\* \* \* \* \*